(12) United States Patent
McDonald et al.

(10) Patent No.: US 7,107,243 B1
(45) Date of Patent: Sep. 12, 2006

(54) SYSTEM AND METHOD FOR AUTOMATED BILL PAYMENT SERVICE

(75) Inventors: Gregory McDonald, San Antonio, TX (US); Patrick Wheeler, San Antonio, TX (US)

(73) Assignee: Citibank, N.A., New York, NY (US)

( * ) Notice: Subject to any disclaimer, the term of this patent is extended or adjusted under 35 U.S.C. 154(b) by 602 days.

(21) Appl. No.: 09/368,045

(22) Filed: Aug. 3, 1999

Related U.S. Application Data

(60) Provisional application No. 60/095,986, filed on Aug. 10, 1998.

(51) Int. Cl.
*G06F 17/60* (2006.01)

(52) U.S. Cl. .......................... 705/40; 705/35
(58) Field of Classification Search .................. 705/40
See application file for complete search history.

(56) References Cited

U.S. PATENT DOCUMENTS

| | | | | |
|---|---|---|---|---|
| 5,220,501 A | * | 6/1993 | Lawlor et al. | 705/40 |
| 5,825,856 A | * | 10/1998 | Porter et al. | 379/93.12 |
| 5,893,902 A | * | 4/1999 | Transue et al. | 704/275 |
| 5,956,700 A | * | 9/1999 | Landry | 705/40 |

OTHER PUBLICATIONS

Business Wire, May 24, 1995, Citibank Eliminates All Fees for Direct Bnaking; Reduces Cost of Banking for Customers.*

* cited by examiner

*Primary Examiner*—Charles R. Kyle
(74) *Attorney, Agent, or Firm*—George T. Marcou; Kilpatrick Stockton LLP

(57) ABSTRACT

A method and system for automated bill payment service makes use of one or more application programs, such as a bank's retail system application and a bill payment application, running on one or more servers, as well as one or more data storage devices. A customer calls, for example, an 800 number and enters identification information in response to prompts by the system. The system verifies the customer's identification and, in response to selection of a single bill payment option, prompts the customer to enter information about at least one bill payment for a payee. The system provides selection of the payee from a customer-specific bill payee list or a system-spoken payee list and various menu functions. The system automatically schedules the bill payment for the customer according to the entered bill payment information, and renders the scheduled payment to the payee for the customer. The system also provides the customer with the ability to check the status of payments that have already been scheduled, as well as to change or cancel payments.

50 Claims, 30 Drawing Sheets

SYSTEM AND METHOD FOR AUTOMATED BILL PAYMENT SERVICE

CROSS REFERENCE TO RELATED APPLICATIONS

This application claims the benefit of U.S. Provisional Application No. 60/095,986 filed Aug. 10, 1998.

FIELD OF THE INVENTION

The present invention relates generally to telephone phone or other voice activated automated bill payment systems, and more particularly to a method and system for automated bill payment service that includes a customer-specific bill payee list, as well as a system-spoken payee functionality.

BACKGROUND OF THE INVENTION

Providing customer services, such as bill payment services, manually by customer service representatives via a telephone typically consumes an inordinate amount of personnel time in terms, for example, of customer service representative telephone traffic. Therefore, a manual bill payment service is a service-related problem for a financial institution, such as a bank. Automation of such a bill payment service would enable the bank, for example, to off-load a tremendous amount of telephone traffic from its customer representatives.

Further, off-loading telephone traffic from customer service representatives by automating such services would enable customer service representatives to provide more service to the same customer base by spending more time with individual customers. Additionally, automation of bill payment services would enable customers, for example, to schedule their payments no matter where they may be located throughout the country. The financial institution may also provide other financial services, including for example, a direct access service, which customers can access via their personal computers (PCs), and he financial institution may also want to allow its customers to utilize bill payment services aspects of such direct access service via the financial institution's automated telephone service.

SUMMARY OF THE INVENTION

It is a feature and advantage of the present invention to provide a method and system of bill payment service that offloads telephone traffic from customer service representatives to enable the representatives to free up time by automating certain functions of the bill payment service.

It is another feature and advantage of the present invention to provide a method and system of automated bill payment service in which the automation of certain functions of the bill payment service enables customer service representatives to provide more service to the same customer base by spending more time with individual customers It is a further feature and advantage of the present invention to provide a method and system for automated bill payment service by telephone which provides customers with the flexibility to schedule payments via telephone in the privacy of their home, or if the customer is traveling, through any phone by using a central number, such as an 800 number.

It is a still further feature and advantage of the present invention to provide a method and system for automated bill payment service which enables customers to select payees from a customer-specific bill payee list, as well as from a system-spoken bill payee list.

It is another feature and advantage of the present invention to provide a method and system for automated bill payment service with menu functions for making a payment, adding a payee, canceling a payment, making a recurring payment, and checking the status of a payment.

It is an additional feature and advantage of the present invention to provide a method and system for automated bill payment service that allows customers to access the system by telephone, regardless of the customer's geographic location.

It is also a feature and advantage of the present invention to provide a method and system for automated bill payment service with the capability to direct the customer to a customer service representative when necessary to assure security with certain functions.

To achieve the stated and other features, advantages and objects, an embodiment of the present invention makes use of computer software applications, such as a bill payment application and a retail system application, running on one or more servers, as well as one or more electronic database storage and database management devices and systems. In an embodiment of the present invention, the bill payment application receives information about at least one bill payment for a customer, automatically schedules the bill payment for the customer according to the bill payment information, and renders the scheduled bill payment to a payee for the customer.

In an embodiment of the present invention, the customer at an input device, such as a telephone, accesses, for example, the bank's retail system application by dialing, for example, an 800 number to request the bill payment service. The retail system application receives the customer's entry of identification information, such as the customer's bank card number and a telephone access code number, in response to an automatic prompt for the information by the application. The retail system application then automatically verifies the customer's identification information. Likewise, the retail system application receives the customer's entry of a selection for the bill payment service in response to an automatic prompt by the application for the selection. Upon entry of the selection, the retail system application automatically hands off the customer and the customer's identification information to the bill payment application.

Alternatively, in an embodiment of the present invention, the customer at the telephone accesses, for example, the bill payment application direct by dialing, for example, another 800 number. The customer likewise enters the customer's identification information in response to prompts by the bill payment application, and the bill payment application automatically verifies the customer's identification information. Regardless of the manner in which the customer accesses the bill payment application, the customer is then prompted by the bill payment system for an election of a voice mode of entering information to the bill payment system or a touch tone mode of entering information to the system. Depending on the mode selected by the customer, the customer is prompted by the bill payment system from that point forward to enter information to the bill payment system in the particular mode selected by the customer.

In an embodiment of the present invention, the bill payment application prompts the customer and receives an election by the customer for one of several bill payment options, such as a recurring bill payment option, an add or change payee for bill payment option, a single bill payment option, and a status, change or cancel a bill payment option. If the customer selects either the recurring bill payment option or the change a payee option, the bill payment application automatically hands off the customer to a customer service representative.

If the customer selects the single bill payment option, the customer is automatically prompted by the bill payment application for an embodiment of the present invention to enter information about a payee for a bill payment, either from a payee ID list of the customer or according to a payee list spoken for the customer by the system. If the payee has a current payee ID list, the customer selects the option to identify the payee from the list and enters an ID number for the payee from the list. If the payee selects the option to identify the payee according to the spoken payee list, the system speaks the payee list, and the customer enters a selection of the payee from the spoken list. The bill payment application identifies the payee according to either the payee ID entered by the customer or the payee picked by the customer from the spoken list. In either case, the bill payment application then verifies the identification of the payee.

In an embodiment of the present invention, the bill payment application automatically prompts the customer for a payment amount for the bill payment and receives the customer's entry of the amount. The bill payment application likewise automatically prompts the customer for entry of a payment date for the bill payment and receives the customer's entry of the date. The bill payment application then verifies the bill payment by automatically prompting the customer to enter a confirmation of the payee, payment and payment amount for the bill payment and receives the customer's confirmation.

Once the bill payment is verified, the bill payment application for an embodiment of the present invention automatically schedules the bill payment and furnishes the customer a payment reference number for the scheduled bill payment. The bill payment application then automatically furnishes the customer a summary of bill payments scheduled for the custom, including the scheduled bill payment, and prompts the customer for selection of an option to hear a list of bill payments scheduled for the customer. Upon entry of a selection by the customer to hear the list, the system automatically speaks the list of scheduled bill payments for the customer.

In an embodiment of the present invention, the scheduled bill payment is rendered for the payment amount indicated by the customer to the payee identified by the customer on the payment date designated by the customer. The payment is rendered, for example, by check, such as a bank certified check for the payment amount or combined with a plurality of other payments, or the payment can be rendered, for example, by electronic transfer of funds.

If the customer enters a selection for the status, change or cancel a bill payment in response to the prompt by the bill payment application for election by the customer of one of the several bill payment options, the bill payment application automatically prompts a selection by the customer for one of a group of selections consisting of status of future bill payments for the customer, change a future bill payment for the customer, change a future bill payment for the customer, and cancel a future bill payment for the customer.

In an embodiment of the present invention, upon receiving a selection by the customer for status of future bill payments for the customer, the bill payment application automatically prompts the customer for a selection of either all open bill payments for the customer or all bill payments for the customer. If the customer enters a selection for all open bill payments, the system automatically speaks the status of all open bill payments for the customer. If the customer enters a selection for all bill payments, the system automatically speaks the status of all bill payments for the customer.

Upon receiving a selection by the customer for change of a future bill payment for the customer, the bill payment application for an embodiment of the present invention automatically prompts the customer for a selection of one of a change of a single bill payment for the customer and a change a of recurring bill payment for the customer. If the customer enters a selection for a change of a single bill payment, the bill payment application automatically prompts and receives the customer's entry of bill payment change information. If the customer enters a selection to change a recurring bill payment, the bill payment application automatically hands off the customer to a customer service representative.

Upon receiving a selection by the customer for cancellation of a future bill payment for the customer, the bill payment application for an embodiment of the present invention automatically prompts the customer to enter a selection for one of cancellation of a single bill payment for the customer and cancellation of a recurring bill payment for the customer. If the customer enters a selection for cancellation of a single bill payment, the bill payment application automatically prompts and receives the customer's entry of single bill payment cancellation information. If the customer enters a selection for cancellation of a recurring bill payment, the bill payment application automatically prompts and receives the customer's entry of recurring bill payment cancellation information.

Additional objects, advantages, and novel features of the invention will be set forth in part in the description that follows, and in part will become more apparent to those skilled in the art upon examination of the following, or may be learned by practice of the invention.

DETAILED DESCRIPTION

Referring now in detail to an embodiment of the present invention, an example of which is illustrated in the accompanying drawings, the system and method for automated bill payment service for an embodiment of the present invention allows a customer to dial a number, such as an 800 number, of a financial institution, such as a bank, and be connected, for example, to the bank's automated service that enables the customer to schedule payments. The customer accesses the system, for example, with a bank card number, along with a personal identification code. The system enables the customer, for example, to schedule single payments, to check the status of payments that have already been scheduled, or to cancel payments. The system also enables the customer to call from anywhere and at any time, at the customer's own convenience, and to set up payments, for example, to various merchants. Further, the system enables the customer to set up payments to practically any payee, for example, in the continental United States.

When the customer accesses the system for an embodiment of the present invention, the customer already has a list of payees. The customer can either pick the customer's payees from the customer's payee list, or if the customer does not have the customer's list available, the customer can hear the system's pre-defined payee list. Once the customer decides who the customer wants to pay, it is only necessary for the customer to tell the system when and how much. Thus, the customer is able to pay bills with the touch of a few keys or by speaking a few words. The system also allows the customer to "personalize" any merchant that the customer wishes to pay. For example, the customer can schedule payments to the customer's mother, a utility company, or even a bank via the system for an embodiment of the present invention. The system sends out payments in different ways. For example, some payments are made electronically, some are made by single checks, and others are made by consolidated checks, depending upon the particular merchant or other payee.

Figure 1:
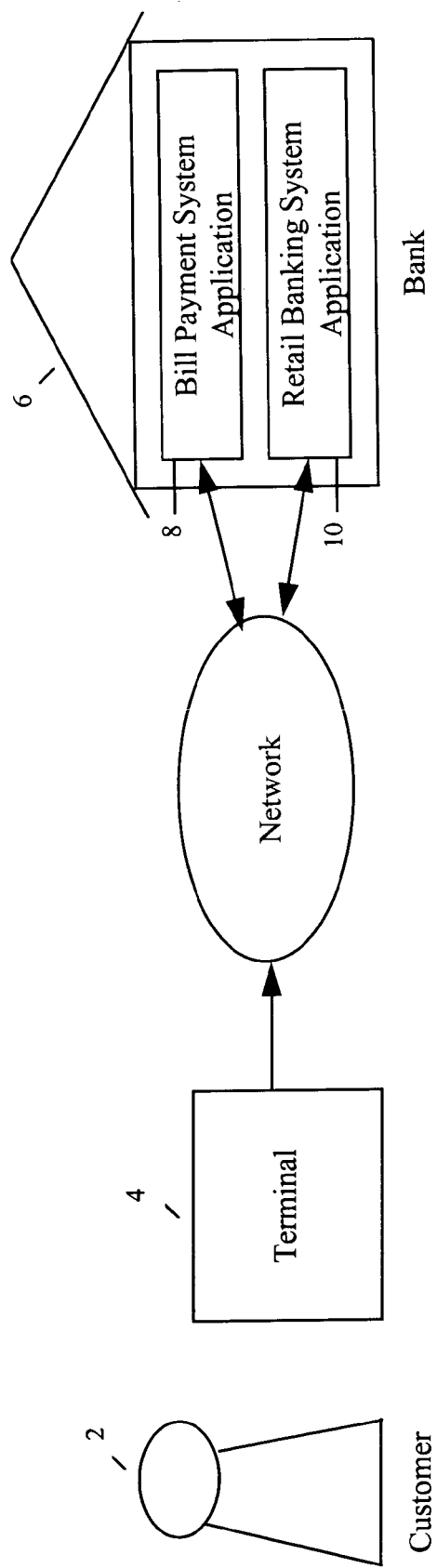
FIG. 1 is a flow chart which shows examples of key components and the flow of information between the key components for an embodiment of the present invention.

FIG. 1 is a flow chart which shows examples of key components and the flow of information between the key components for an embodiment of the present invention. Referring to FIG. 1, the customer 2 at a terminal 4, such as a telephone or personal computer (PC), first calls the bank 6, for example, by dialing a designated 800 number to access the bank's system, and the customer is offered an option on an auto-attendant to make a bill payment. The bank's system, includes, for example, a retail banking system application 10 and a bill payment application 8 running on one or more servers, as well as one or more data storage and database management devices and systems.

In an embodiment of the present invention, once the customer 2 selects the option for bill payment, the system asks the customer if the customer would like to use the automated bill payment service or a manned service. If the customer 2 chooses the automated service, the system tells the customer, for example, "Welcome to our bill payment service, please enter your bank card number and telephone access code." The bank card number is typically the same card the customer 2 uses when the customer accesses an automated teller machine (ATM) or customer access terminal (CAT) system.

Regardless of how the customer 2 enter the bill payment automated service for an embodiment of the present invention, all customers are returned to a main menu of the bank's phone system application 10 by stating, for example: "For banking services other than bill payment, press or say pound then star." An embodiment of the present invention provides, for example, an interface between the bill payment system application 8 and the retail phone system application 10 that is transparent to the customer 2. When the customer 2 presses, for example, "#-*" or says "pound-star," the bill payment application 8 hands the customer off to the bank's retail phone system application 10, together with the customer's card number and access code.

In an embodiment of the present invention, the interface between the retail system application 10 and the bill payment application 8 allows the hand-off of the customer's bank card number and bank phone application access code from the retail application 10 to the bill payment application 8. If the retail system 10 is unable to complete the hand-off, the customer 2 is transferred to the bill payment application 8, and the customer is requested to re-enter the customer's card number and access code. If the customer 2 presses, for example, "0" for immediate referral and selects option one in a welcome sub-menu, the customer is transferred to the bill payment automated service 8 and must enter the customer's card number and access code at this point.

Figure 2:
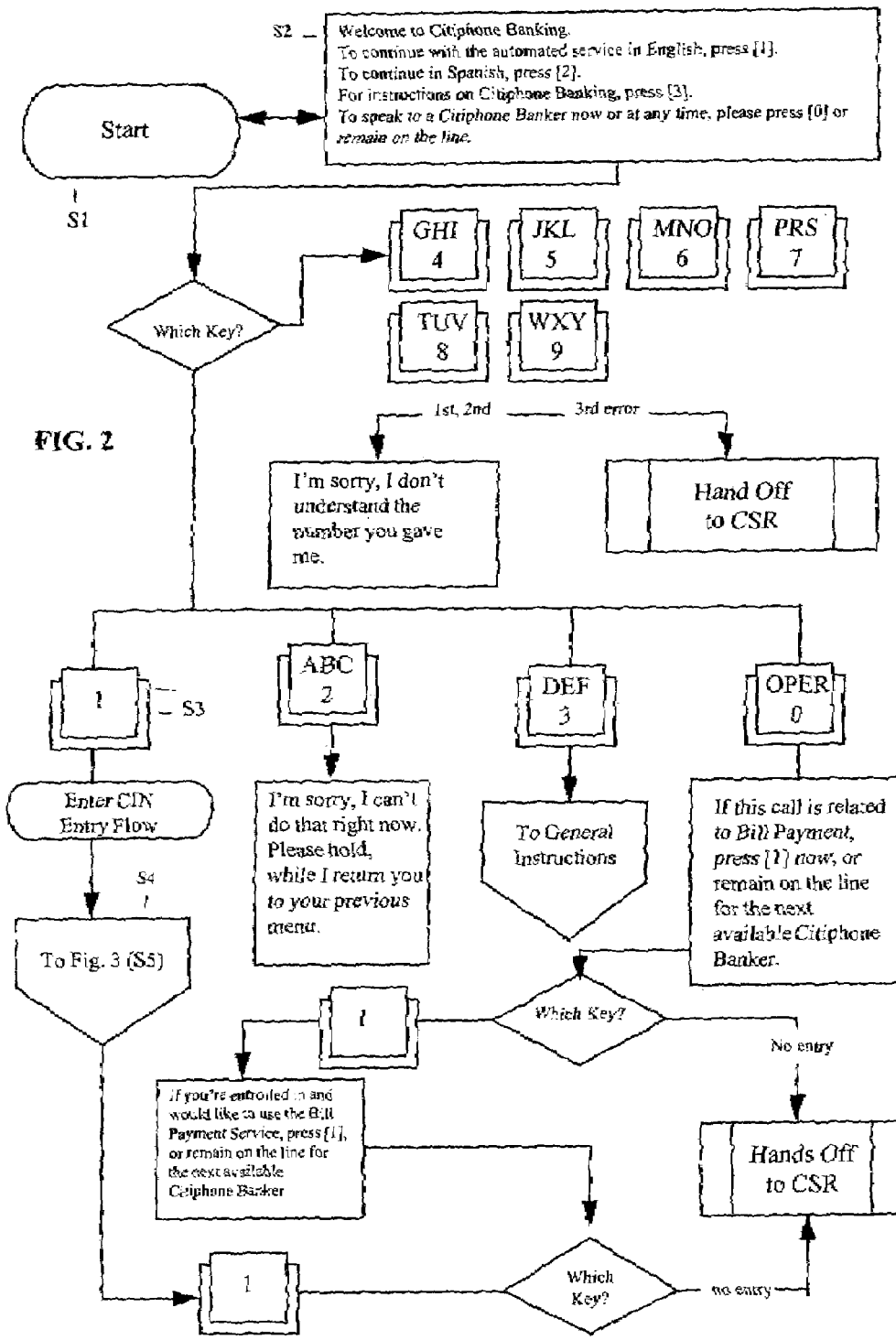
FIG. 2 is a flow chart which illustrates an example of the process of the customer 2 accessing the automated bill payment system 8 from the welcome menu for an embodiment of the present invention.

In an embodiment of the present invention, the customer 2 can access the bill payment system 8 for an embodiment of the present invention from a welcome menu. FIG. 2 is a flow chart which illustrates an example of the process of the customer 2 accessing the automated bill payment system 8 from the welcome menu for an embodiment of the present invention. Referring to FIG. 2, at S1, the customer 2 accesses the bank's system, and at S2, a welcome menu prompts the customer with several options, including an option to continue the automated service in English. At S3, if the customer 2 selects the option to continue, at S4, the process continues to a bank card identification process.

Figure 3:
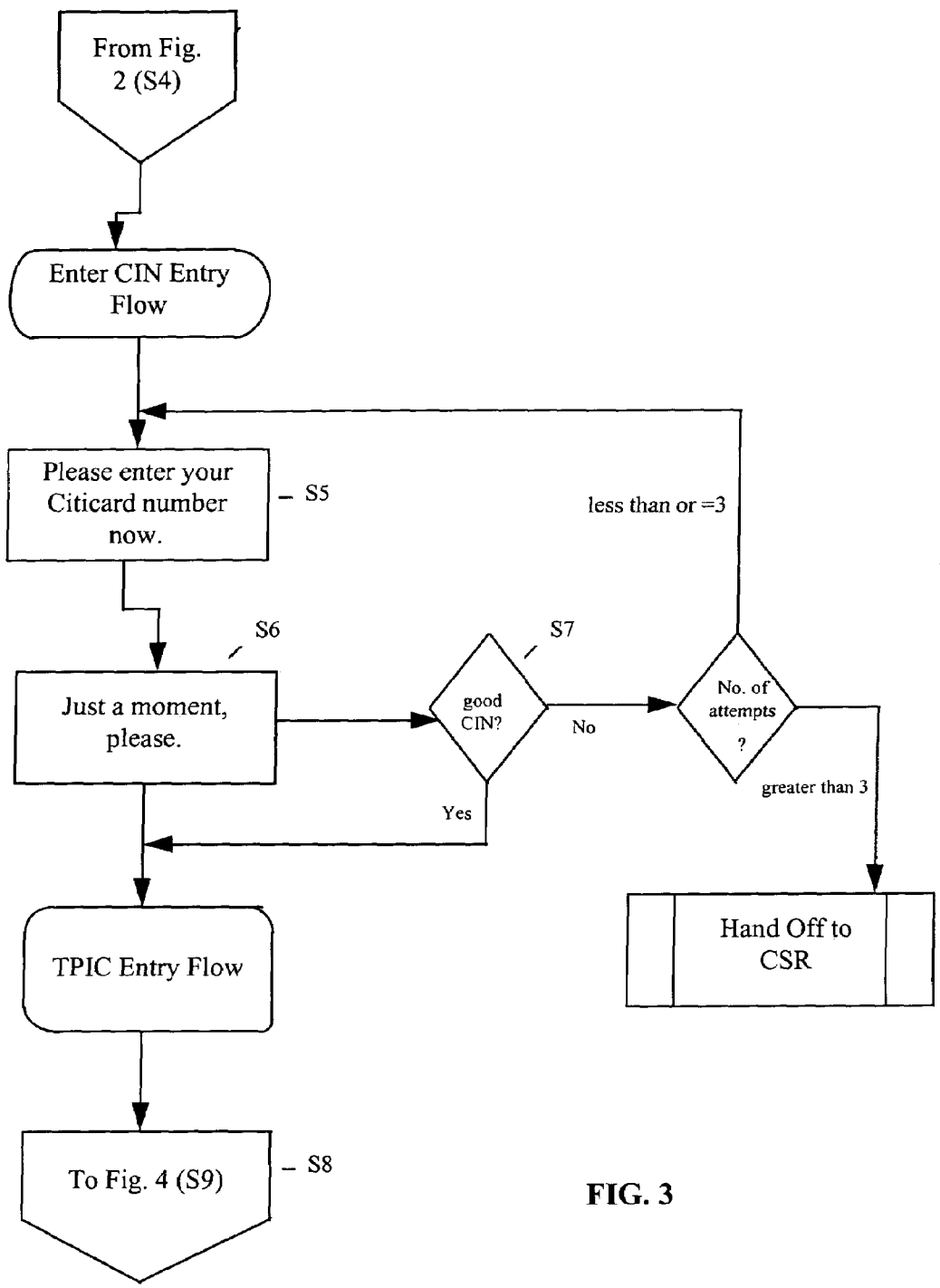
FIG. 3 is a flow chart which illustrates an example of the bank card identification process for an embodiment of the present invention.
Figure 4:
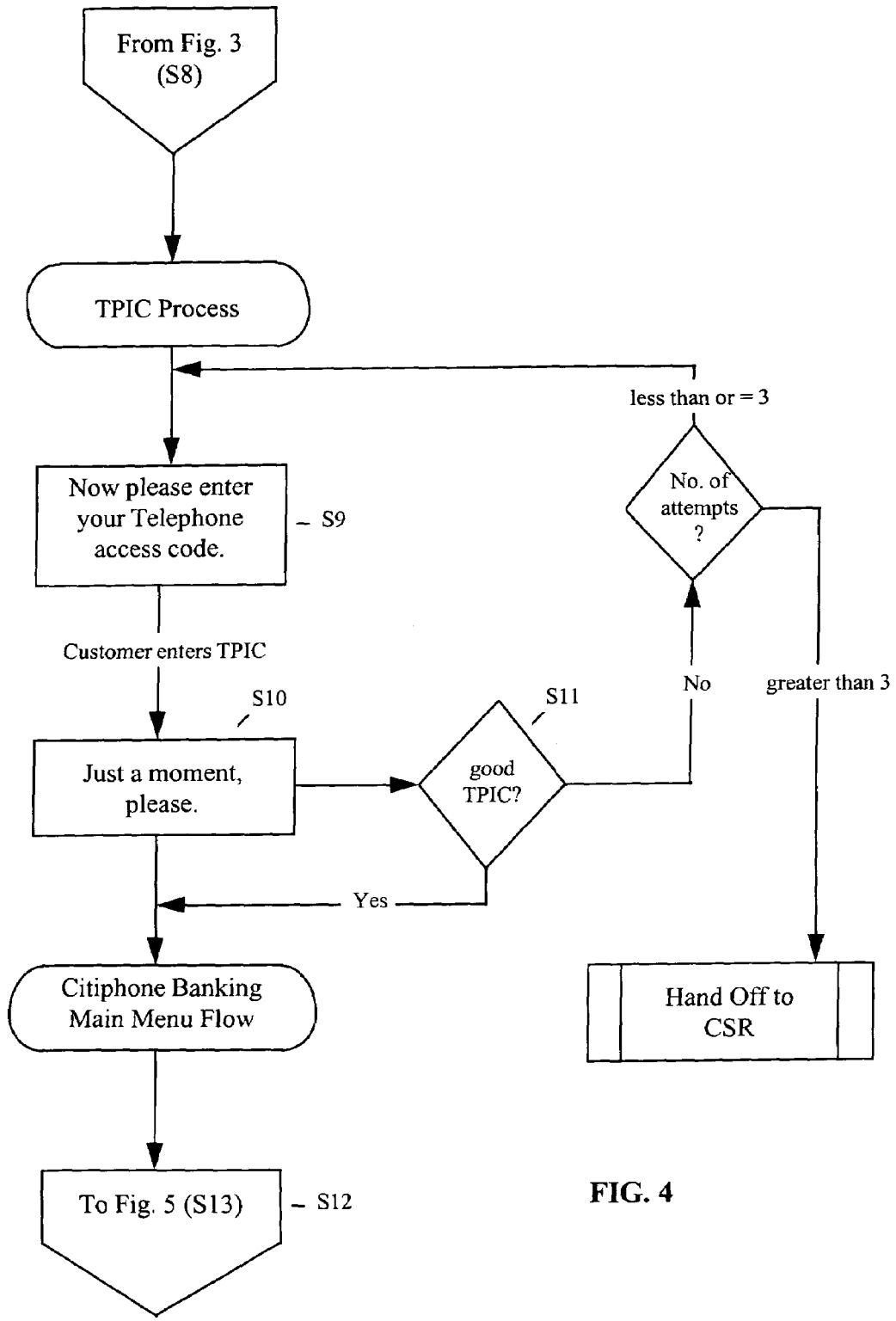
FIG. 4 is a flow chart which illustrates an example of the access code identification process for an embodiment of the present invention.

FIG. 3 is a flow chart which illustrates an example of the bank card identification process for an embodiment of the present invention. Referring to FIG. 3, at S5, the customer 2 is prompted to enter, for example, the customer's bank card number, and at S6, the customer enters the bank card number. At S7, the system confirms the validity of the bank card number, and at S8, the process continues to an access code identification process. FIG. 4 is a flow chart which illustrates an example of the access code identification process for an embodiment of the present invention. Referring to FIG. 4, at S9, the customer 2 is prompted to enter, for example, the customer's telephone access code, and at S10, the customer enters the access code. At S11, the system confirms the validity of the customer's access code, and at S12, the process continues to an introduction menu process.

Figure 5:
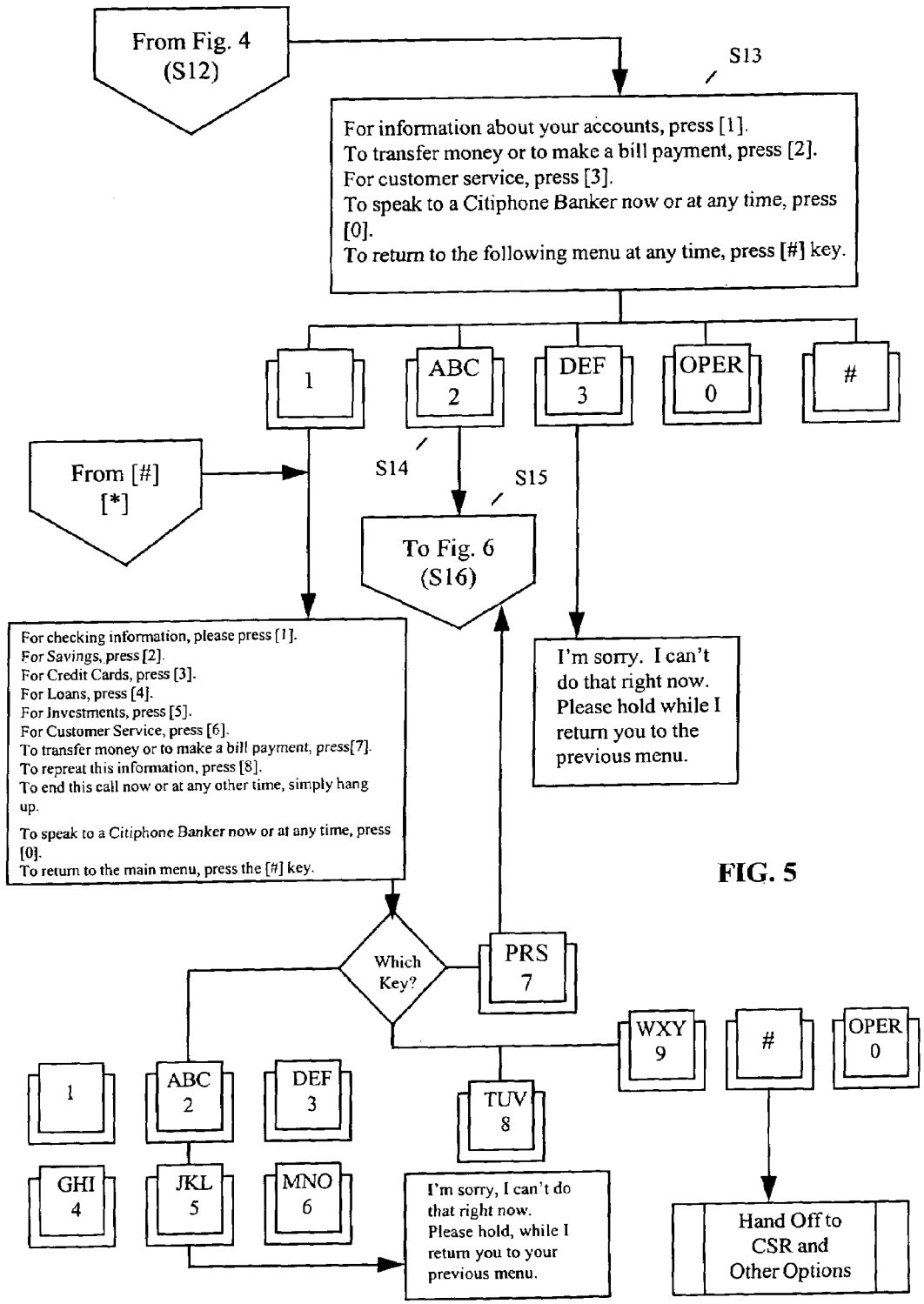
FIG. 5 is a flow chart which illustrates an example of the introduction menu process for an embodiment of the present invention.
Figure 6:
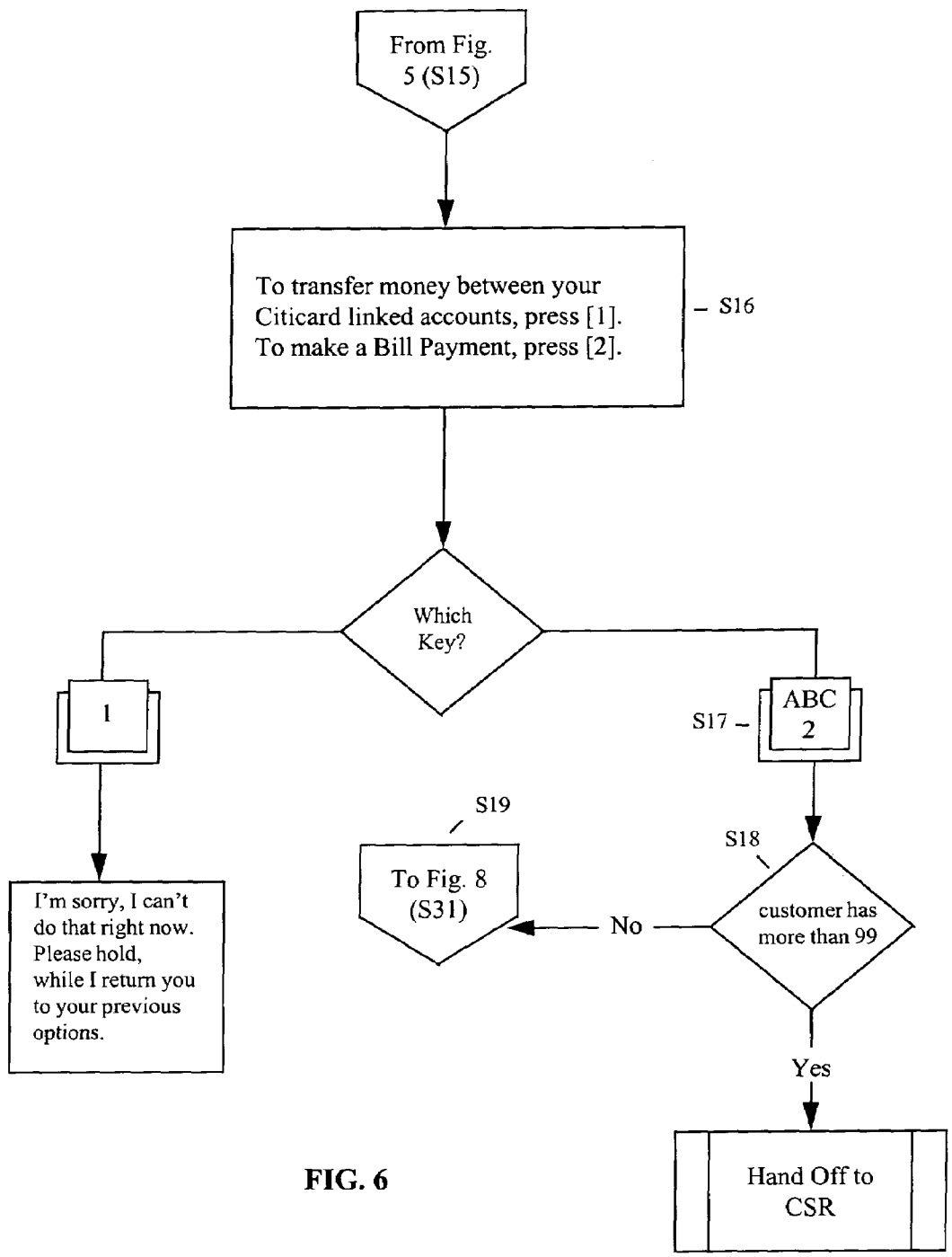
FIG. 6 is a flow chart which illustrates an example of the bill payment election process for an embodiment of the present invention.

FIG. 5 is a flow chart which illustrates an example of the introduction menu process for an embodiment of the present invention. Referring to FIG. 5, at S13, the system prompts the customer 2 with an introduction menu including a number of options, such as an option to transfer money or make a bill payment. If the customer 2 selects the option to transfer money or make a bill payment at S14, at S15, the process continues to a bill payment election process. FIG. 6 is a flow chart which illustrates an example of the bill payment election process for an embodiment of the present invention. Referring to FIG. 6, at S16, the customer 2 is prompted for an election to transfer money or to make a bill payment. At S17, if the customer 2 selects bill payment, the system confirms that the customer 2 has 99 payees or less at S18. At S19, the process continues with a selection of touch tone or voice recognition process in FIG. 8.

The system for an embodiment of the present invention supports a pre-determined number of payees for the customer 2, such as 89 payees, and makes use of a customer payee list with a numbering system that starts, for example, at eleven. Referring further to FIG. 6, at S18, if the system determines that the customer 2 has more than 89 payees, which will appear to the customer as a payee count of 99, since the payee numbering system is, for example, from 11 through 99, the system states, for example: "The bill payment system can only process up to 99 payees at this time; please hold while I transfer you to a representative," and the customer is routed out of the application 8 and to a customer service representative (CSR).

Figure 7:
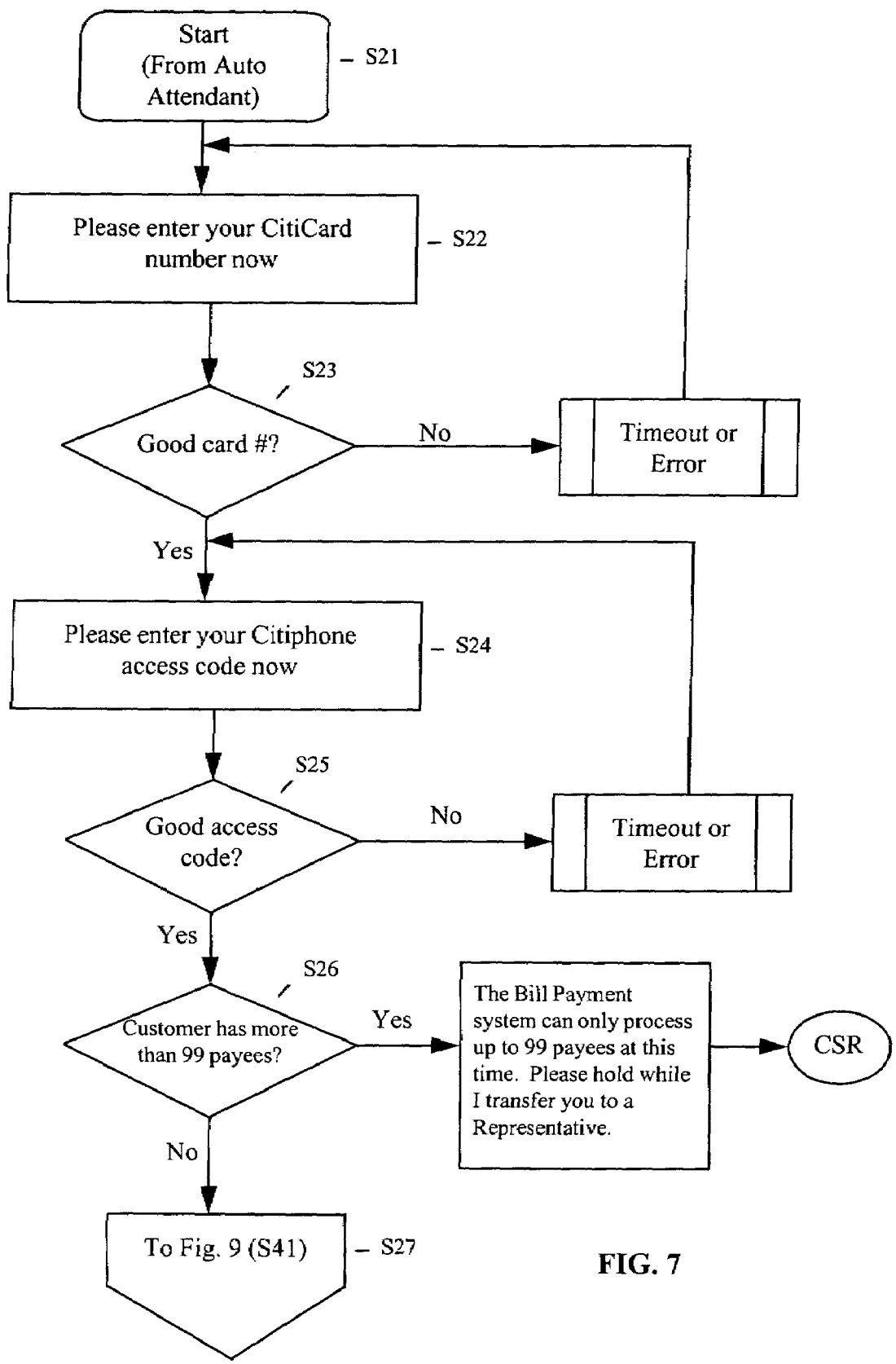
FIG. 7 is a flow chart which illustrates an example of the process of accessing the bill payment system 8 from an auto attendant for an embodiment of the present invention.

FIG. 7 is a flow chart which illustrates an example of the process of accessing the bill payment system 8 from an auto attendant for an embodiment of the present invention. Referring to FIG. 7, at S21, the customer 2 access the bill payment system 8 from an auto attendant and is prompted to enter the customer's bank card number. At S22, the customer 2 enters the bank card number, and at S23, the system confirms the validity of the customer's bank card number. At S24, the customer 2 enters the customer's telephone access code in response to a prompt from the system, and at S25, the system confirms the validity of the access code. At S26, the system confirms that the customer 2 has 99 payees or less, and at S27, the process continues with the election process for touch tone or voice recognition for the customer.

Figure 8:
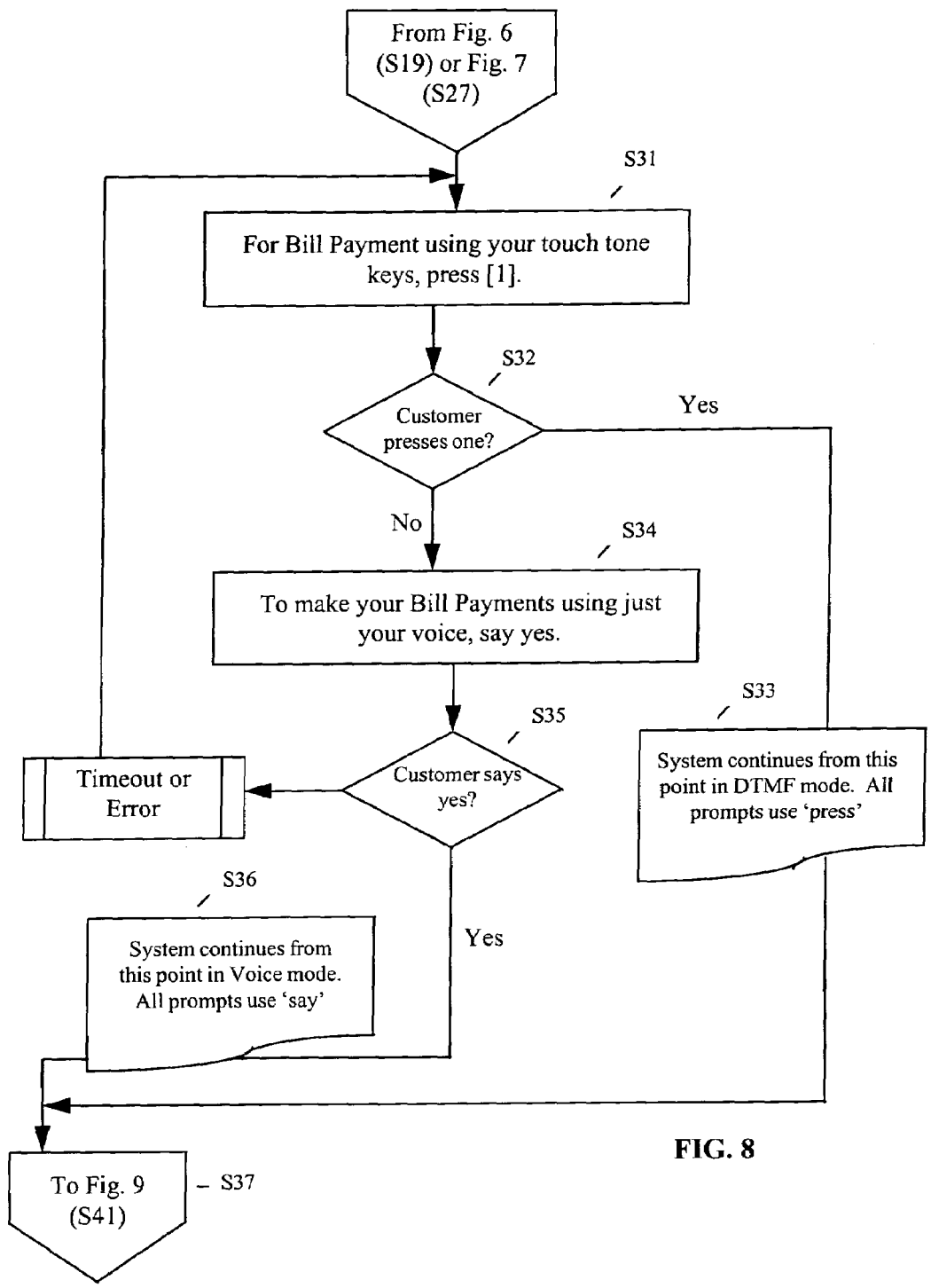
FIG. 8 is a flow chart which illustrates the election process for touch tone or voice mode for an embodiment of the present invention.

FIG. 8 is a flow chart which illustrates the election process for touch tone or voice mode for an embodiment of the present invention. Referring to FIG. 8, at S31, the customer 2 is prompted to enter a selection for the touch tone option. If the customer 2 selects the touch tone option at S32, the system continues at S33 in dial tone multiple frequency (DTMF) or touch tone mode using "press" for all prompts. If the touch tone option is not selected, at S34, the customer 2 is prompted to enter a selection for the voice mode option. At S35, if the voice mode option is selected, the system continues at S36 using, for example, "say" for all prompts. Once a selection is made for the touch tone or voice mode option, at S37, the process continues to the bill payment menu process in FIG. 9.

The system for an embodiment of the present invention uses DTMF, so that the customer 2 makes a selection, such as a payee, by selecting the number using a telephone keypad, and the system speaks, for example, the payee list. The customer 2 is given a choice of whether the customer wishes to process the customer's bill payment by touch tone (DTMF) or voice recognition. When in the touch tone process, the voice recognition option is not available. Voice response allows the customer 2 to speak the answer using discrete voice recognition technology. While in the voice recognition option, the touch tone technology is also available.

The system for an embodiment of the present invention also makes use of speaker independent voice recognition (SIRV), such as Type 1 SIRV, which utilizes discrete voice recognition prompts from a selected vocabulary set. The system reads back the confirmation number of a payment, concatenating numbers from the existing prompt database of the phone system. Alternatively, Type 2 SIRV can be used for an embodiment of the present invention. With Type 2 SIRV, which utilizes natural type speech, the customer 2 speaks, for example, "two," and the system selects option two from the interactive voice recognition (IVR), system, or the customer speaks specific words, such as "repeat", "go," "pay," or "help."

Figure 9:
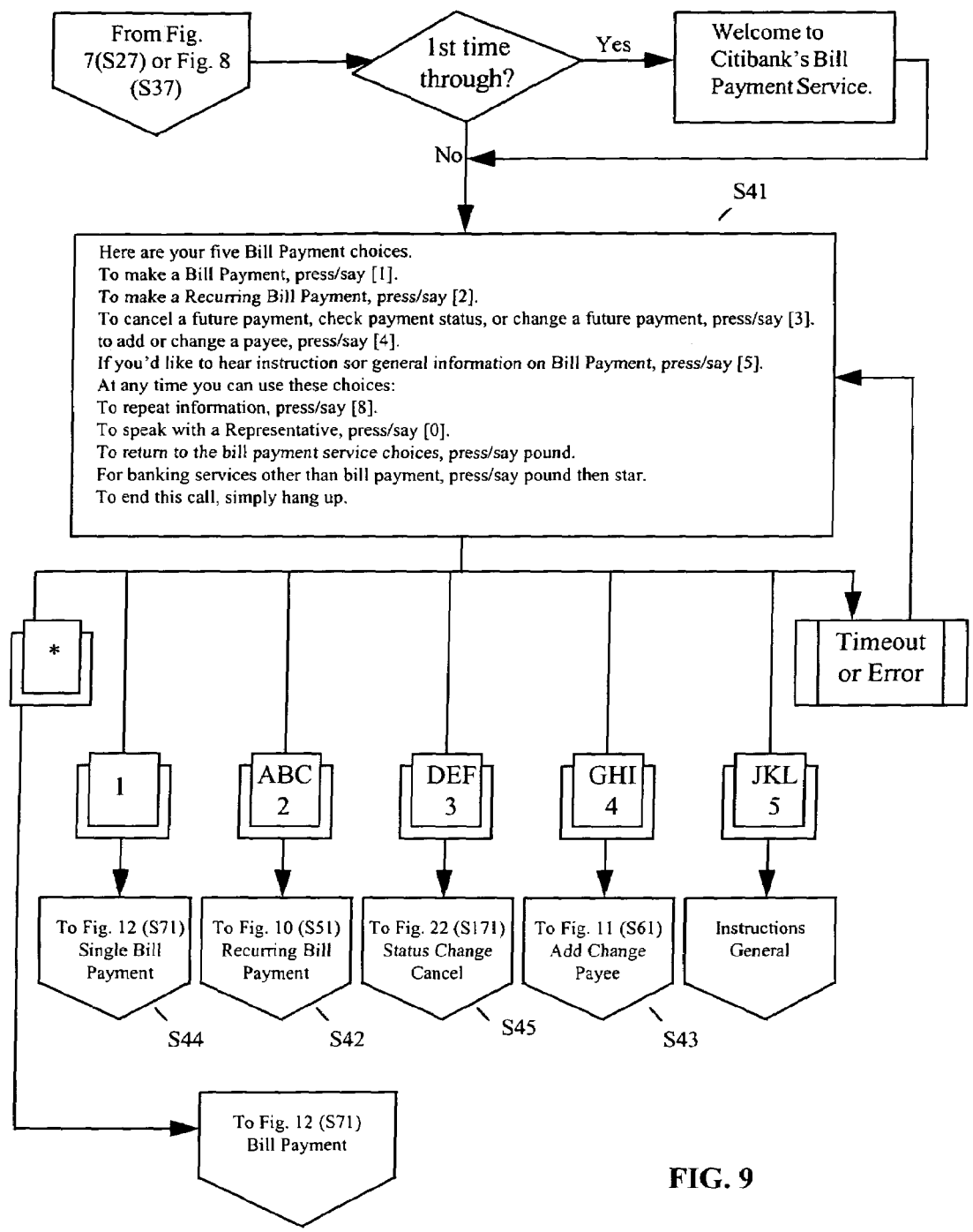
FIG. 9 is a flow chart which illustrates the bill payment menu process for an embodiment of the present invention.

FIG. 9 is a flow chart which illustrates the bill payment menu process for an embodiment of the present invention. In the bill payment menu process, the customer 2 is prompted with a menu that provides choices, for example, to make a recurring bill payment, to add or change a payee, to make a single bill payment, and to cancel a future payment, check payment status or change a future payment. Referring to FIG. 9, at S41, the customer 2 is prompted to enter a selection from the bill payment choices menu. Referring again to FIG. 9, if the customer 2 selects recurring bill payment, at S42, the process continues with the recurring bill payment process in FIG. 10. If the customer 2 selects add or change a payee, at S43, the process continues with the add or change a payee process in FIG. 11. If the customer 2 selects make a single bill payment, at S44, the process continues with the single bill payment process in FIG. 12. If the customer 2 selects cancel a future payment, check payment status or change a future payment, at S45, the process continues with the status change or cancel process in FIG. 22.

Figure 10:
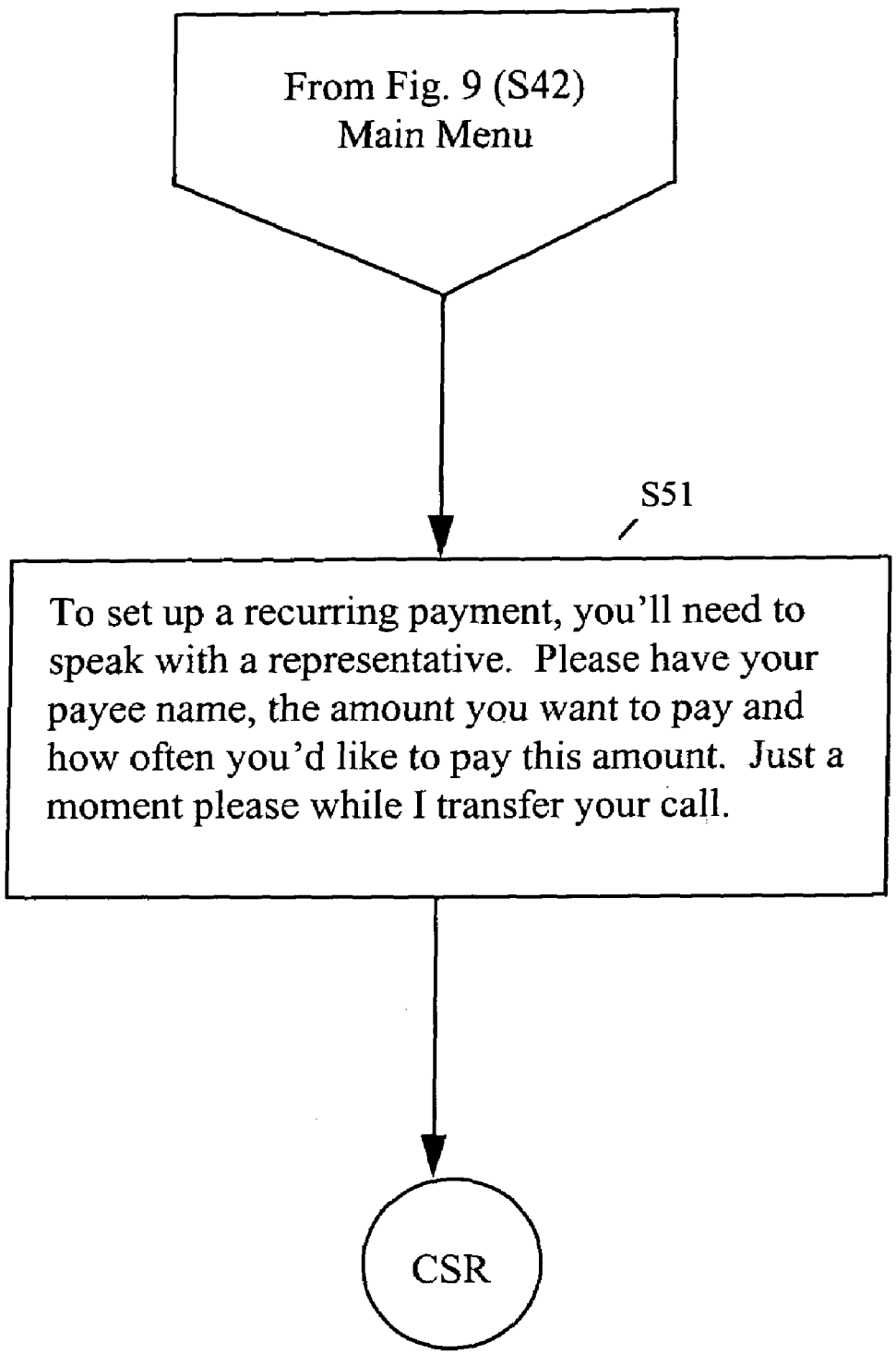
FIG. 10 is a flow chart which illustrates an example of the recurring bill payment process for an embodiment of the present invention.

FIG. 10 is a flow chart which illustrates an example of the recurring bill payment process for an embodiment of the present invention. Referring to FIG. 10, if the customer 2 selects recurring bill payment in the bill payment menu process, at S51, the system transfers the customer to a customer service representative (CSR). In an embodiment of the present invention, when the customer 2 selects recurring payments, for example, via the telephone 4, the customer must speak with a CSR to verify the caller ID, and the CSR provides required documentation to the customer for the customer to set up instructions for the recurring payment.

Figure 11:
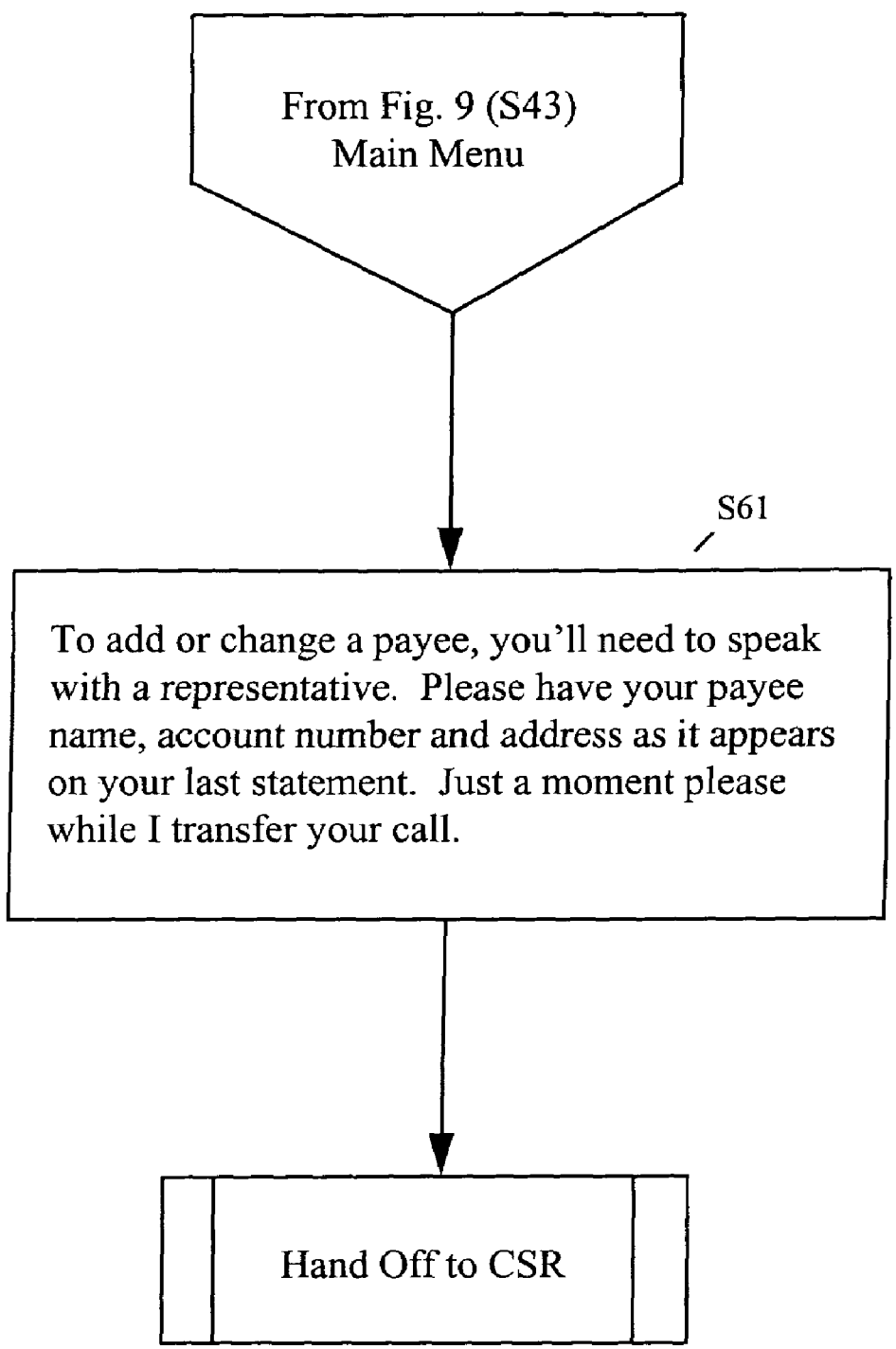
FIG. 11 is a flow chart which illustrates an example of the add or change a payee process for an embodiment of the present invention.

FIG. 11 is a flow chart which illustrates an example of the add or change a payee process for an embodiment of the present invention. Referring to FIG. 11, if the customer 2 selects add or change a payee in the bill payment menu process, at S61, the system likewise transfers the customer to a CSR. If the customer 2 requests the option to add a payee to the payee list, this change must be made through a verification process that is not automated. Selection of this option results in the customer 2 receiving a message, such as: "Please hold, in order to add a payee, we have to transfer you to a service representative; please have the information available and hold for the next available representative." If the customer 2 selects add or change a payee, the customer is transferred to the CSR on a telephone, and the CSR takes the customer through an ID process to assure the identity of the customer who wants to add a payee.

Figure 12:
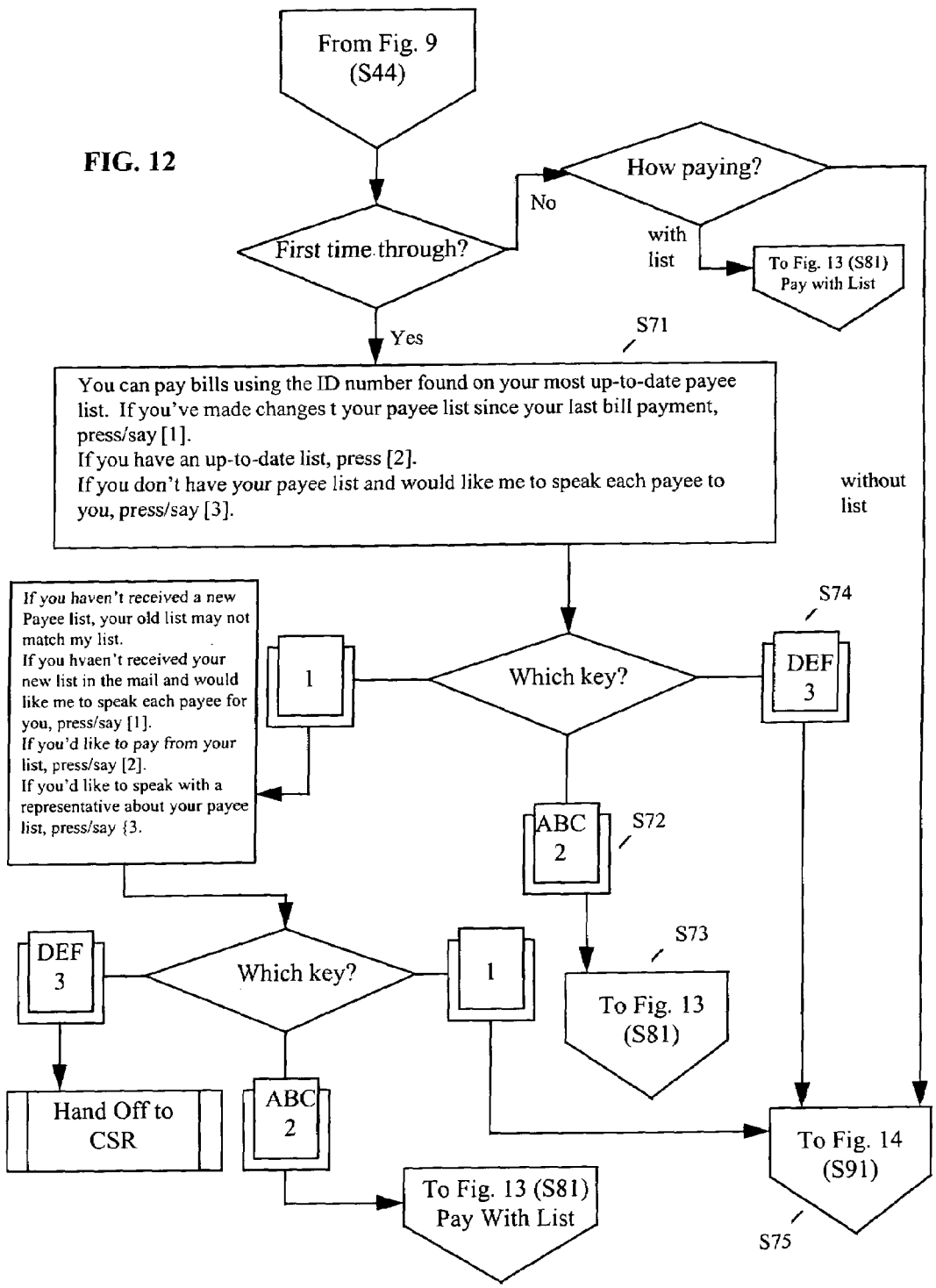
FIG. 12 is a flow chart which illustrates an example of the single bill payment process for an embodiment of the present invention.

FIG. 12 is a flow chart which illustrates an example of the single bill payment process for an embodiment of the present invention. Referring to FIG. 12, if the customer 2 selects single bill payment in the bill payment menu process, at S71, the customer is asked, for example, if the customer has a current payee list. An embodiment of the present invention includes a customer payee list in which, for example, identification (ID) numbers are associated with each merchant that the customer includes, starting for example, with the number eleven for the first merchant on the list.

Figure 13:
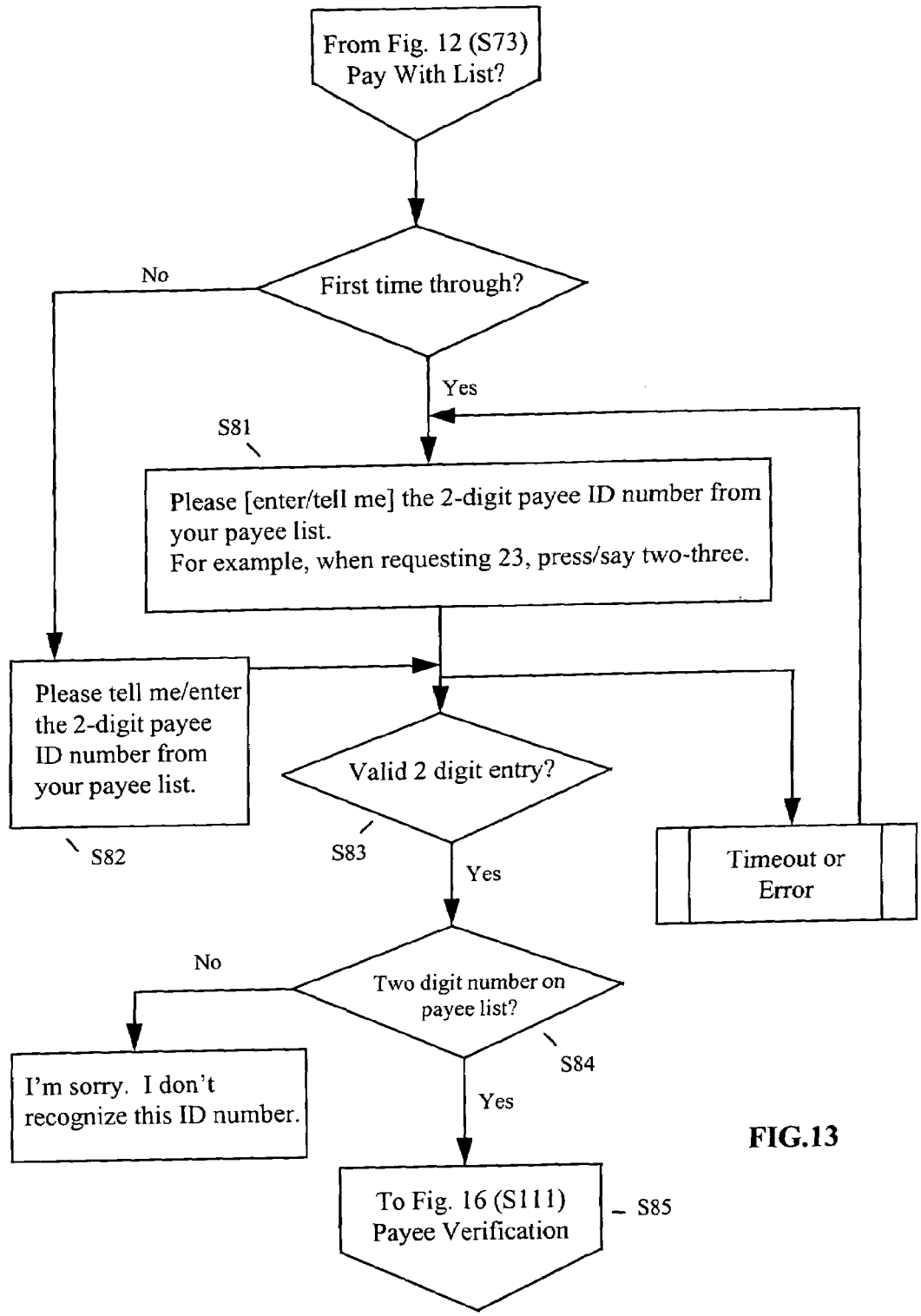
FIG. 13 is a flow chart which illustrates an example of the pay with payee ID process for an embodiment of the present invention.

Referring further to FIG. 12, if at S72, the customer 2 responds that he or she has an updated payee list, for example, by pressing "2" (or saying "two"), the process continues with a pay with payee ID process at S73. FIG. 13 is a flow chart which illustrates an example of the pay with payee ID process for an embodiment of the present invention. Referring to FIG. 13, at S81, the customer 2 is prompted to enter the two-digit payee ID from the customer's payee list. If for example, the customer 2 has scheduled payments, the customer can choose to make payments by inputting the two digit ID number for a particular payee from the customer's payee list at S82. At S83, the system confirms a valid two-digit entry, and at S84, the system confirms that the payee ID is on the customer's payee list. At S85, the process continues with a payee verification process in FIG. 16.

As an example of the single bill payment process for an embodiment of the present invention, assume that the customer wants to make a payment, for example, to Ford Motor Credit. If the customer has a payee list, the customer simply enters the number for the merchant or other party to be paid. For this example, assume that Ford Motor Credit is listed as number eleven on the customer's payee list. To select the particular payee, at S82 in FIG. 13, the customer can press "1—1" (or say "one—one"). If the particular payee is not found or the system is unable to retrieve the payee at S84 in FIG. 13, the customer is prompted, for example, with: "I'm sorry, I don't recognize this ID number; please hold for the next available representative."

Figure 14:
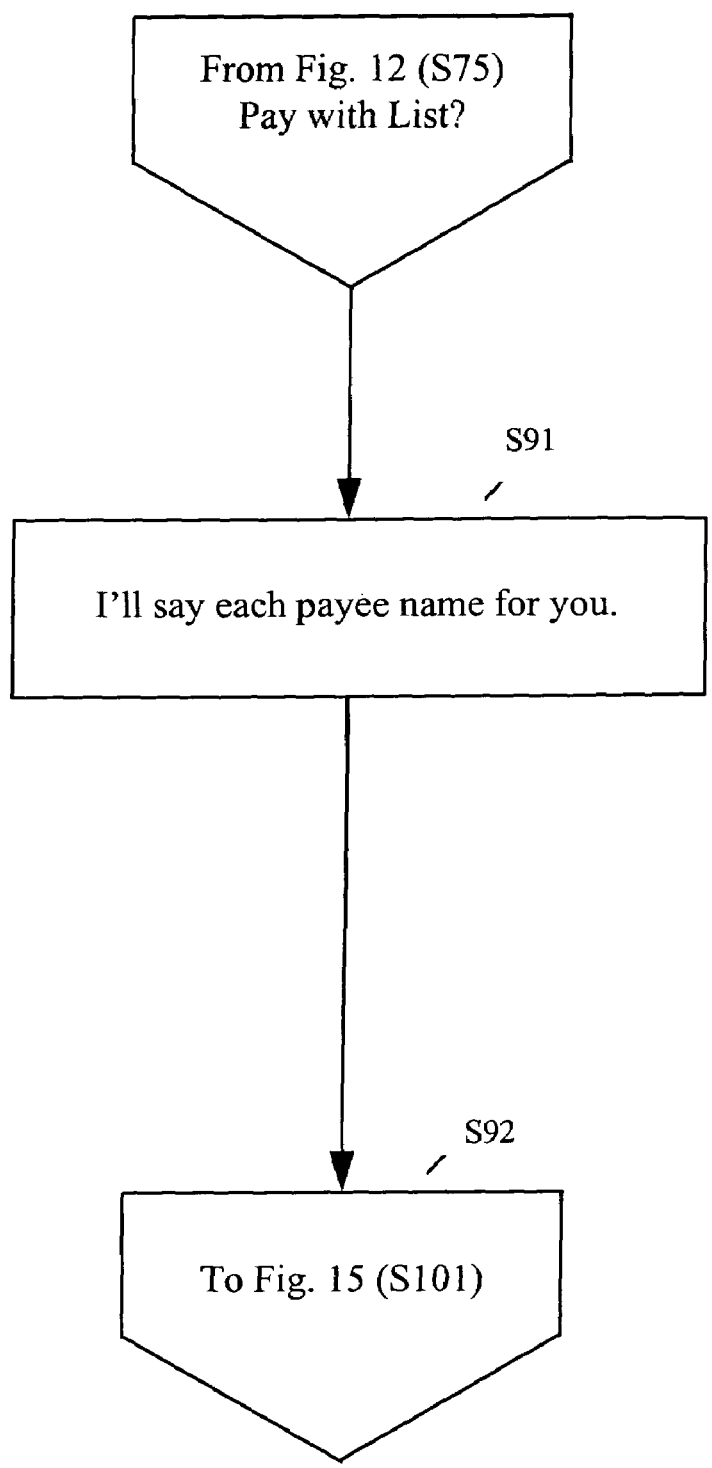
FIG. 14 is a flow chart which illustrates an example of the speak the payee process for an embodiment of the present invention.

Referring again to FIG. 12, if at S74, the customer 2 responds that he or she does not have a payee list, for example, by pressing "3" (or saying "three"), the process continues with a speak the payee process at S75. FIG. 14 is a flow chart which illustrates an example of the speak the payee process for an embodiment of the present invention. Referring to FIG. 14, if the customer 2 selects the option to hear the customer's payee list from the single bill payment process, at S91, the system reads the customer's payee list to the customer, and at S92, the process continues with a pay without list process.

Figure 15:
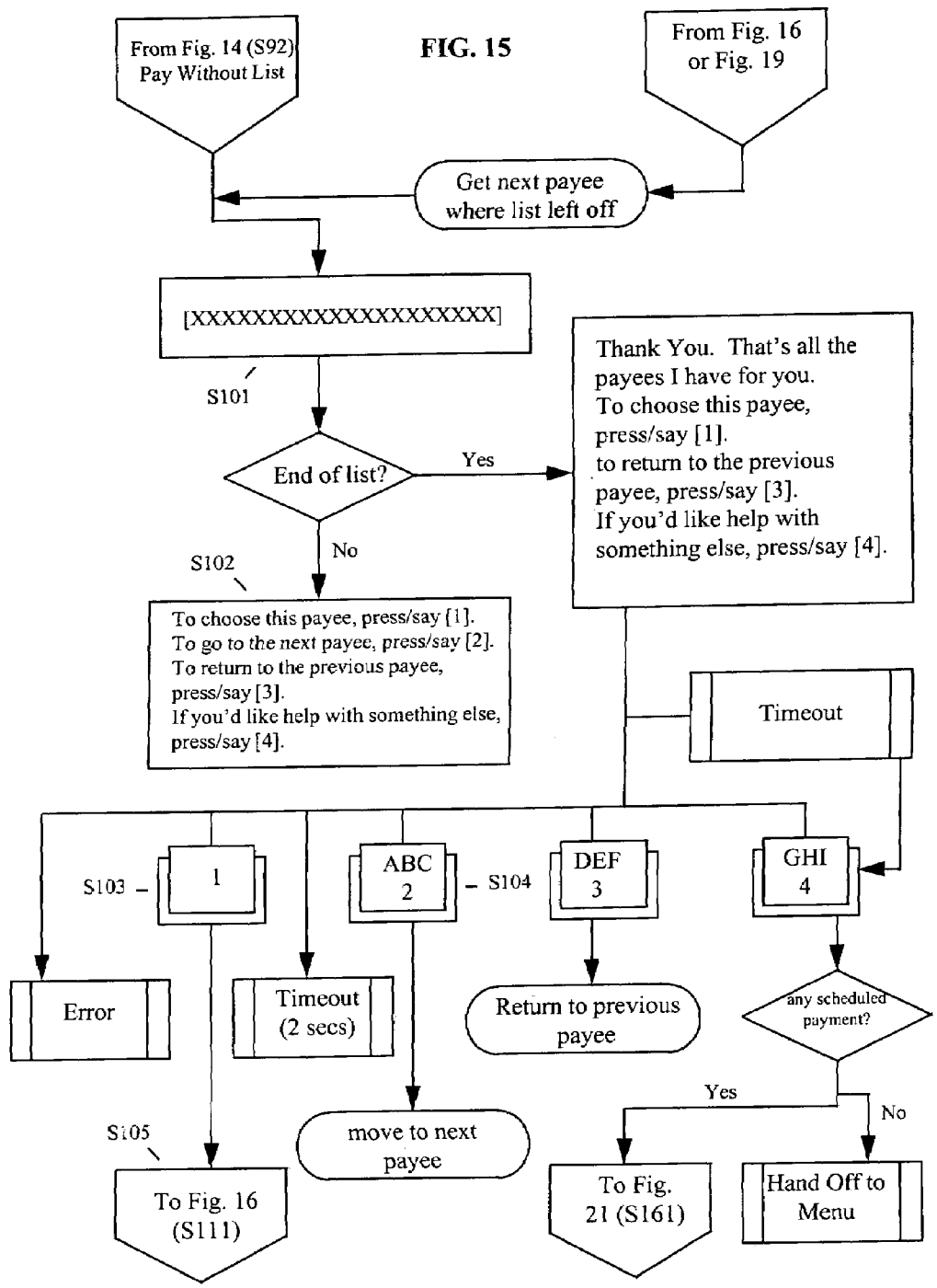
FIG. 15 is a flow chart which illustrates an example of the pay without list process for an embodiment of the present invention.

FIG. 15 is a flow chart which illustrates an example of the pay without list process for an embodiment of the present invention. Referring to FIG. 15, if the customer 2 selects the option to hear the customer's payee list, at S101, the system speaks the customer's payee list. Navigation rules are activated to follow each merchant recording or payee spelling on the payee list, and at S102, as the customer 2 hears the customer's payees listed, the customer is prompted for example, with: "I'll say each payee name for you; to choose this payee, press "1" (or say "one"); to go to the next payee, press "2" (or say "two"); to return to the previous payee, press "3" (or say "three"); or if you'd like help with something else, press "4" (or say "four")."

Referring further to FIG. 15, if the customer 2 calls in and does not have an updated payee list, the customer can select an option to utilize the system's capability to speak the payee's name from the system's merchant list. If the customer selects this option, the system proceeds to speak the list of merchant names in short-name order at S101 in FIG. 15. For example, at S101, the system may say: "Ford Motor Credit", and at S102, the system says, for example: "To choose this payee, press "1" (or say "one"); to go to the next payee, press "2" (or say "two"); or to return to the previous payee, press "3" (or say "three"). If the customer presses "1" (or says "one") at S103, the process continues at S105 with a payee verification process in FIG. 16. If the customer wants to continue through the list, the customer presses "2" (or says "two") at S104, and the system proceeds to the next merchant on the list and asks the same questions.

Referring again to FIG. 15, in a session with the customer 2, at S101, the system for an embodiment of the present invention retrieves information, for example, for up to 33 payees from a mainframe and stores them in a buffer for future retrieval during that session. This continues until the maximum number, for example, of 89 payees (numbers "11" through "99") are loaded into the buffer. All payee information is pulled into the buffer for all payees when the customer profile is retrieved. When all of the customer's payees are loaded into the buffer, the system checks for duplicate payee names for each payee for the entire session. When a duplicate name is found, the IVR application numbers the duplicate in numeric sequential order, such as "Citibank card-1; Nynex; Citibank card-2." This is the order in which they were originally received from the host, and the numbering system matches the numbering system on the customer's payee list.

Referring further to FIG. 15, from the buffered group of 13 payees, at S102, the bill payment application 8 for an embodiment of the present invention continues to the next bill payment until all have been heard or the customer 2 terminates the session. The list is read, for example, with a two-second pause between items. Groups, for example, of 5 payees are maintained, unless the last group is less than 5. While the customer 2 is listening to a group of 5, the system goes and gets another group, for example, of 13, when the number of payees in the previously buffered group of 13 is at 5 or less payees.

Referring again to FIG. 15, for example, thirteen items are received, and the system for an embodiment of the present invention speaks the first five items at S101. When the system goes to speak the second 5 items (6 through 10), the system detects that only 3 items remain. While reading the second 5 items, the system goes and retrieves the next 13 items, if available. Then the system combines the remaining 3 items with the next 13 and speaks the third group of 5 (11–15). If no other items are available, or if the remaining items are less than 5, the application speaks only the remaining items.

An embodiment of the present invention includes a recorded list of common payees. Those merchants within the common payees list are selectable by the customer 2 using the spoken list option. In addition, the system for an embodiment of the present invention has the capability to accept a merchant's name by spelling. Another functionality of the system for an embodiment of the present invention is text-to-speech (Centigram), which provides the capability to convert ASCII text into the spoken word. For example, the IVR system converts a payee name that has not been recorded into the spoken word, and speaks it back to the customer 2. Additionally, the customer's payee list may be modified so that, if the customer 2 selects, for example, number "41," the system may say "Aunt Mary," and the customer may then select the payee and schedule payments to that payee.

In an embodiment of the present invention, up to, for example, 10,000 standard merchant names are recorded and stored in a network interactive voice recognition (NIVR) system. If a merchant is not recorded in the system, the system looks to the payee name (also known as a short name or pet name) and then spells the name using alphanumeric recordings. The payee name is a maximum number of characters, such as 12 characters. All non-alphanumeric symbols, including spaces, are spelled or spoken. The spelling occurs in the application payee list for the pay with payee ID process, the speak the payee process without a payee ID number, and any other part of the application 8 where the customer's vendor name is requested. When a new payee is added to the system for an embodiment of the present invention, and not yet recorded, the system spells the payee or pet name up to the alphanumeric character maximum length.

An embodiment of the present invention also provides the customer 2 with the ability to maneuver within the payee list. For example, by selecting "2," the customer 2 advances to the end of this list; or the customer can return to the top of the list by pressing "3." Once the customer 2 makes a selection, the process continues at S105 in the payee verification process. The system proceeds through the same process for scheduling a payment for the customer using the merchant list as for the customer having a payee list, including providing the customer with a reference number.

Figure 16:
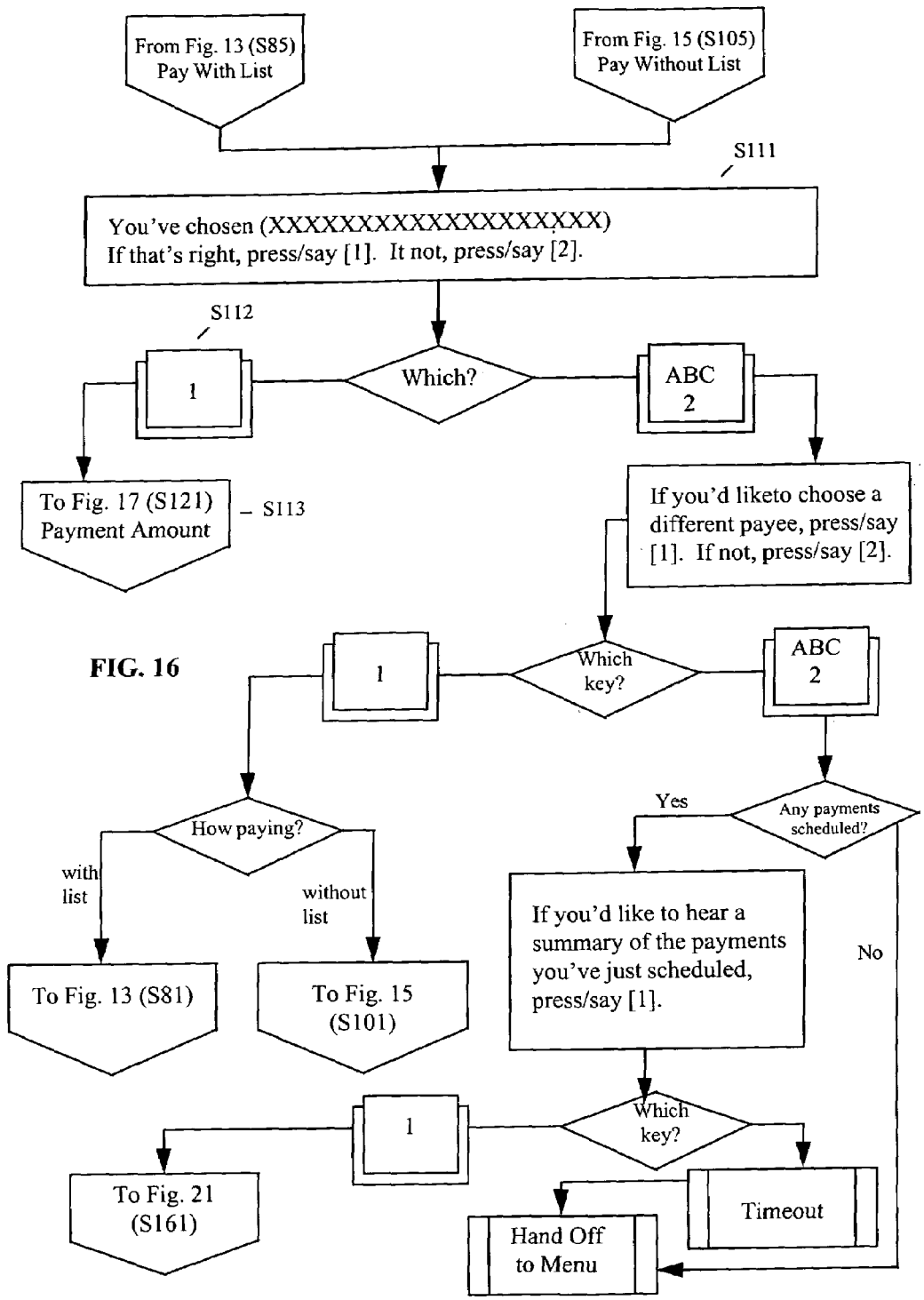
FIG. 16 is a flow chart which illustrates an example of the payee verification process for an embodiment of the present invention.

FIG. 16 is a flow chart which illustrates an example of the payee verification process for an embodiment of the present invention. An embodiment of the present invention continues with the payee verification process from the pay with payee ID process at S85 in FIG. 13, and from the pay without list process at S104 in FIG. 15. Referring to FIG. 16, at S111, the system reads the payee name chosen by the customer 2 and prompts the customer to confirm the chosen payee. In the example of the entry of Ford Motor Credit by the customer 2, at S111 in FIG. 16, the customer is told that the customer has selected Ford Motor Credit. At S112, if the customer 2 confirms the name of the payee, the process continues with a payment amount process at S113.

Figure 17:
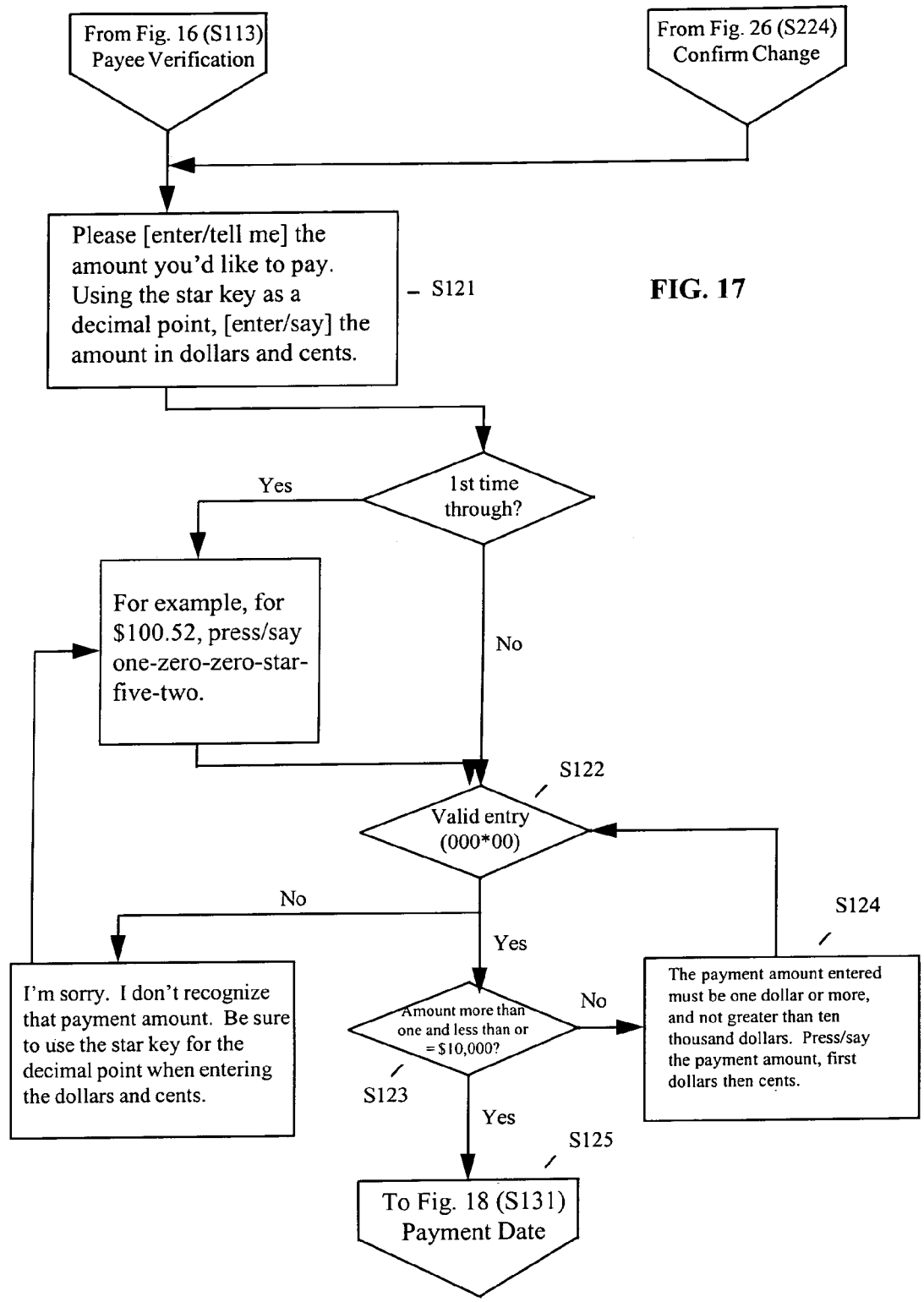
FIG. 17 is a flow chart which illustrates an example of the payment amount process for an embodiment of the present invention.

FIG. 17 is a flow chart which illustrates an example of the payment amount process for an embodiment of the present invention. Referring to FIG. 17, at S121, the customer 2 is prompted to enter a payment amount and enters the desired amount. At S122, the system confirms that a valid entry was made, and at S123, system confirms, for example, that the entered amount is an acceptable sum. In the example of Ford Motor Credit, assume the customer 2 wants to pay 350.00 dollars. Once the customer 2 enters and verifies the payee as Ford Motor Credit, at S121 in FIG. 17, the customer is asked "Please enter (or "tell me") the amount you'd like to pay; using the star key as a decimal point; enter (or "say") the amount in dollars and cents," and the customer inputs the dollar amount as 350.00 dollars by pressing "3-5-0-*-0-0" (or saying "three-five-zero-star-zero-zero").

In an embodiment of the present invention, if the amount entered at S121 in FIG. 17 is determined by the system at S123 in FIG. 17 to be greater or less than a pre-determined sum, such as greater than $10,000 or less than $1.00, at S124, the system speaks, for example: "The payment amount entered must be one dollar or more and not greater than ten thousand dollars; press (or say) the payment amount, first dollars then cents." If the entry is valid and the amount acceptable, the process continues to a payment date process at S125.

Figure 18:
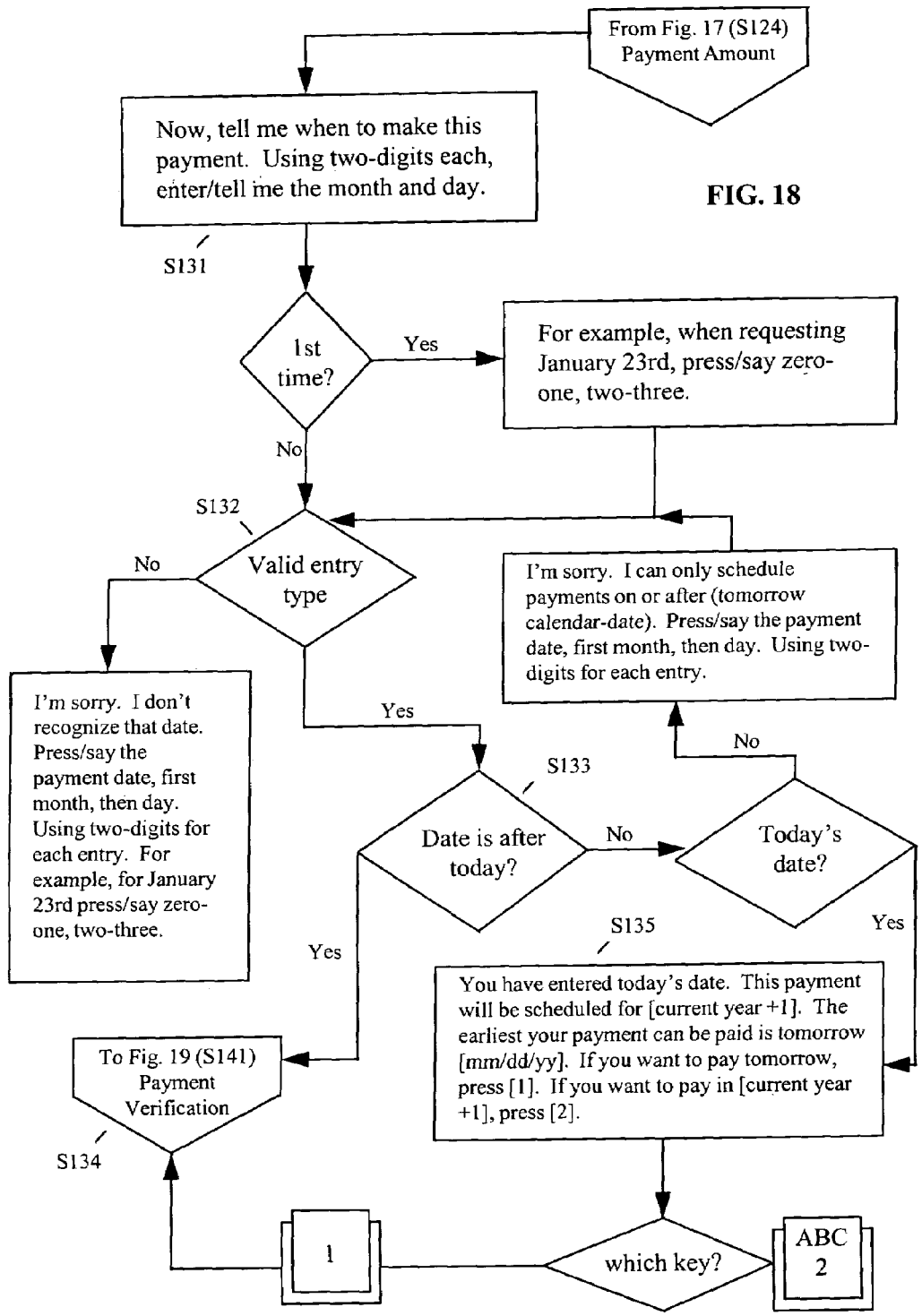
FIG. 18 is a flow chart which illustrates an example of the payment date process for an embodiment of the present invention.

FIG. 18 is a flow chart which illustrates an example of the payment date process for an embodiment of the present invention. Referring to FIG. 18, at S131, the customer 2 is prompted to enter a payment date and enters a date. The date and number set for the bill payment application 8 for an embodiment of the present invention is the same source, for example, as the bank's retail phone system application 10. The bill payment application 8 accepts, for example, a four digit date, two of which digits are for the month and two of which are for the day (MM/DD).

In the example of a 350.00 dollar payment to Ford Motor Credit, assume that the customer 2 wants the payment made on Jan. 23, 1999. When the payee and amount are entered, at S131 in FIG. 18, the system 8 asks the customer 2, for example: "Tell me when to make this payment; using two-digits each, enter the month and day," and the customer tells the system when to make the payment. In order to make the payment the next day, at S135, the customer 2 presses, for example, "1" (or says "one"). In order to make the payment on another date, the customer presses, for example, "2" (or says "two") and then enters the payment date. To make the payment on Jan. 23, 1999, the customer presses "0-1-2-3-9-9" (or says "zero-one-two-three-nine-nine").

The application 8 for an embodiment of the present invention calculates and inputs the year based on the present date and calendar month (1998, 1999, and so on). The system adds the year dynamically when the customer 2 enters the four-digit date at S131 in FIG. 18. For example, if today's date is Jul. 4, 1998, then 08/13 is recorded as Aug. 13, 1998, and 03/23 is recorded as Mar. 23, 1999. Referring further to FIG. 18, at S132, the system verifies that a valid entry was made, and at S133, the system verifies that the date is later than the current date. If the entry is valid and the date is after the current date, the process continues to the payment verification process at S134.

Figure 19:
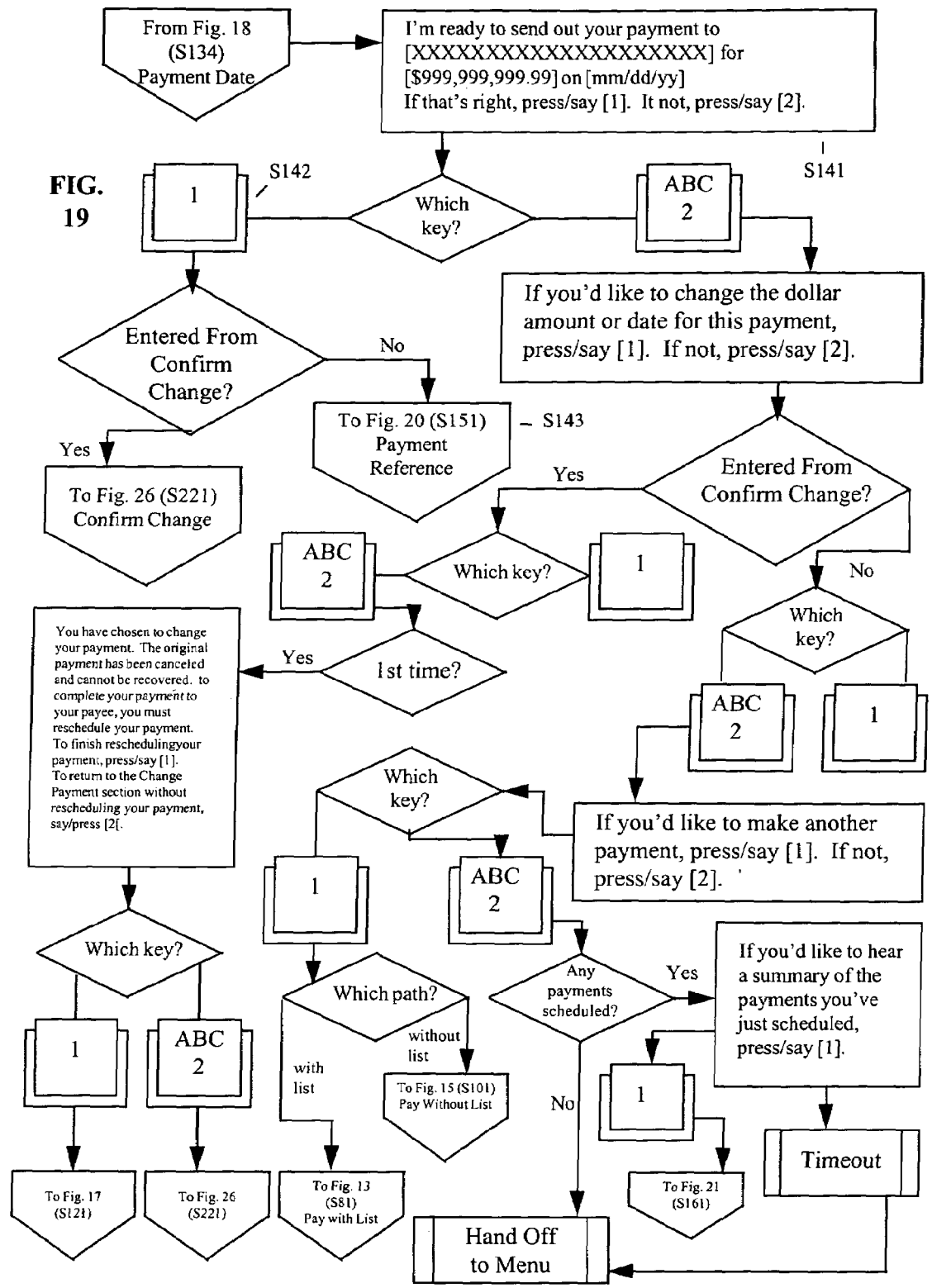
FIG. 19 is a flow chart which illustrates an example of the payment verification process for an embodiment of the present invention.

FIG. 19 is a flow chart which illustrates an example of the payment verification process for an embodiment of the present invention. Referring to FIG. 19, at S141, the customer 2 is prompted to verify the selected payee, the entered amount, and the entered date. If the customer 2 verifies the payee, amount and date at S142, the system verifies that the process was not entered from a confirm change process, and the process continues to a payment reference process at S143. In the example of a payment for the customer 2 to Ford Motor Credit, at S141 in FIG. 19, the system 8 says, for example: "I'm ready to send out your payment to Ford Motor Credit for 350.00 dollars on Jan. 23rd, 1999; if that's right, press "1" (or say "one"); if not, press "2" (or say "two")." The customer 2 then presses "1" (or says "one") to accept the payment selection at S142, and the process continues to the payment reference process at S143.

Figure 20:
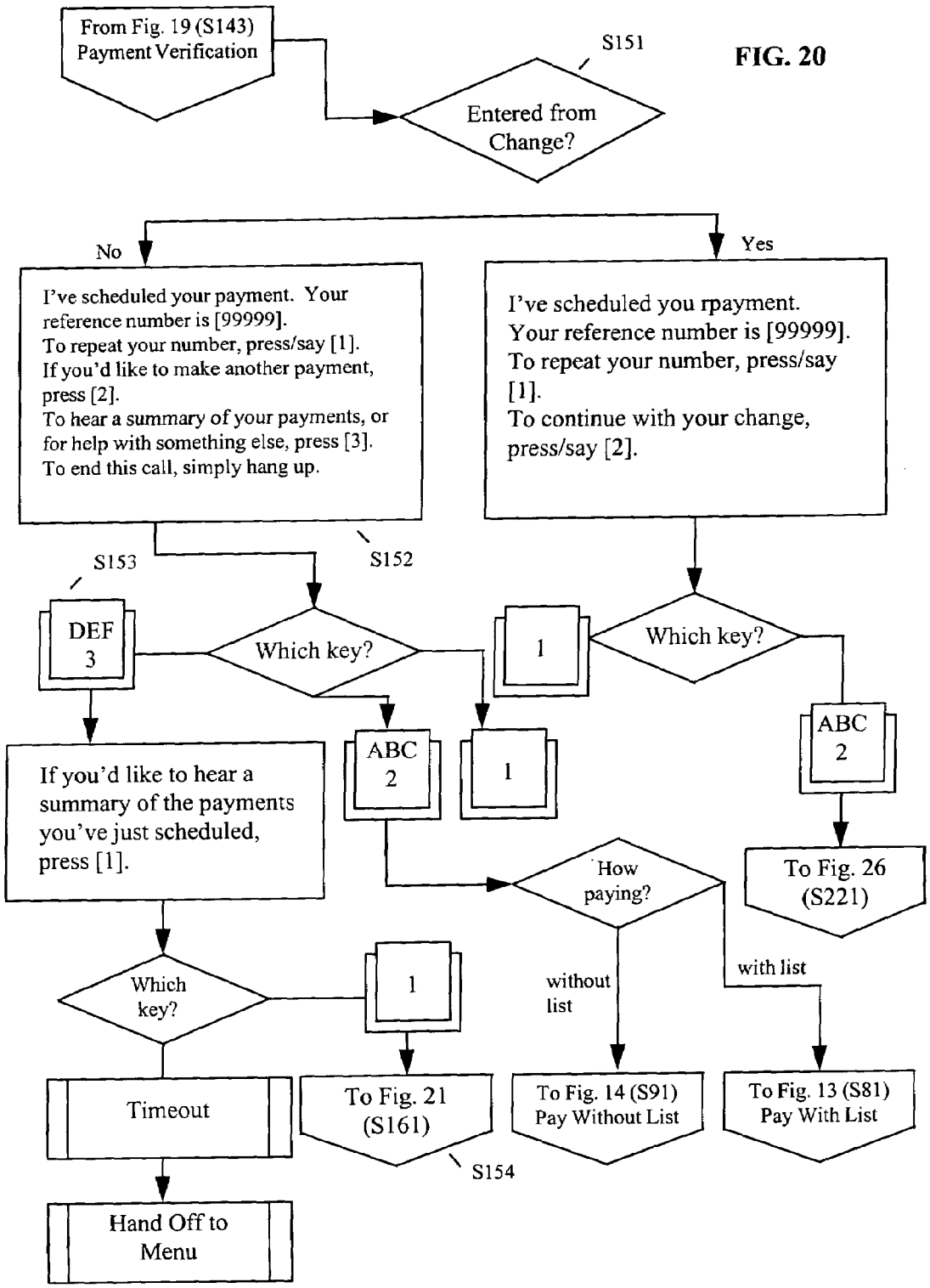
FIG. 20 is a flow chart which illustrates an example of the payment reference process for an embodiment of the present invention.

FIG. 20 is a flow chart which illustrates an example of the payment reference process for an embodiment of the present invention. Referring to FIG. 20, at S151, the system confirms that the process was not entered from the change process and prompts the customer 2 with a menu at S1152, which includes, for example, a choice to hear a summary of the customer's payments. If the customer 2 selects the option to hear the summary at S153, the process continues at S154 to a payment summary process. In the example of a payment for the customer to Ford Motor Credit, once the customer 2 accepts the payment selection at S142 in FIG. 19, the system 8 confirms the selection at S152 in FIG. 20 by saying, for example: "I've scheduled your payment" and provides, for example, a 6-digit reference number, such as "999999," for the scheduled payment to the customer for the customer's records. When the customer 2 confirms a bill payment, the system provides the customer, for example, the 6-digit reference number. The system uses current prerecorded numbers to read the confirmation number back to the customer 2. The numbers are spoken as single digits each, such as "9-9-9-9-9-9." The system furnishes a reference number to the customer 2 for each payment that the customer schedules.

Figure 21:
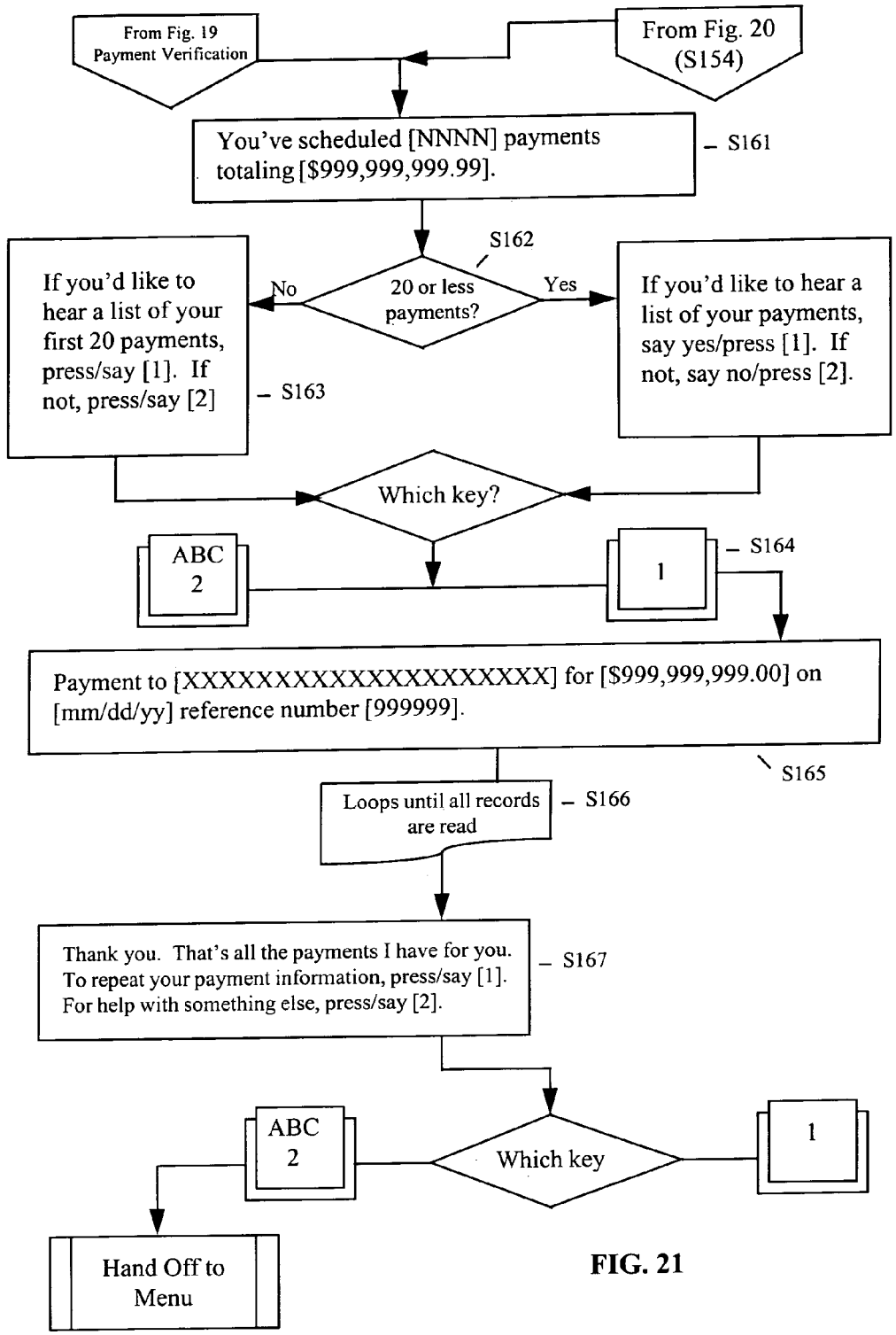
FIG. 21 is a flow chart which illustrates an example of the payment summary process for an embodiment of the present invention.

FIG. 21 is a flow chart which illustrates an example of the payment summary process for an embodiment of the present invention. Referring to FIG. 21, at S161, the customer 2 is given the number and total sum of the customer's payments. At S162, the system confirms that the number of payments is less than a predetermined number, such as twenty or less, and at S163, the customer is prompted with a choice to hear a list of the customer's first twenty payments. The system for an embodiment of the present invention presents a total count and amount to the customer 2 for each session of bill payments. The system keeps bill payment detail for only a pre-determined number of payments, such as the first twenty or less bill payments, for presentment to the customer 2. If the customer 2 selects the option to hear the list of payments at S164, the system speaks the payee, payment amount, payment date, and the reference number at S165, and the system loops until all records are read at S166. At S167, the system offers the customer 2 additional options.

Figure 22:
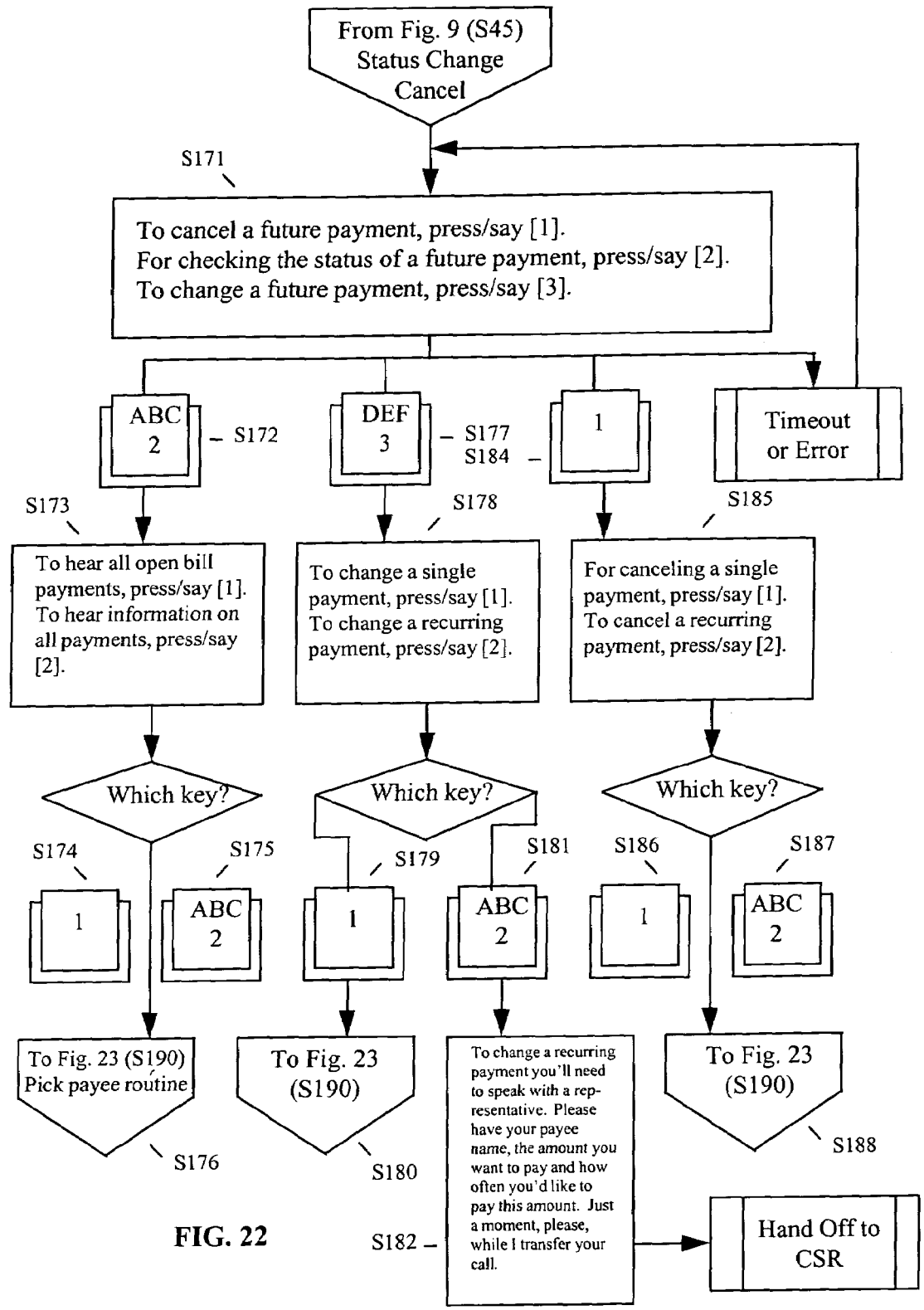
FIG. 22 is a flow chart which illustrates an example of the status, change or cancel process for an embodiment of the present invention.

Referring again to FIG. 9, if the customer 2 selected the status, change, or cancel option from the bill payment choices menu, the process is continued at S45 in FIG. 9 to the status, change, or cancel process. FIG. 22 is a flow chart which illustrates an example of the status, change or cancel process for an embodiment of the present invention. Referring to FIG. 22, at S171, the customer 2 is prompted with a menu for selection of options, for example, to check the status of a future payment, to change a future payment, or to cancel a future payment. Referring further to FIG. 22, if the customer 2 selects the option to check the status of a future payment at S172, the customer is prompted at S173 to enter a selection to hear all open bill payments or information on all payments. From a selection by the customer at S174 of all open bill payments, or from a selection by the customer at S175 of information on all payments, the process continues at S176 to a pick payee process in FIG. 23.

Referring also to FIG. 22, if the customer 2 selects the option to change a future payment at S177, the customer is prompted at S178 to enter a selection to change a single payment or to change a recurring payment. From a selection by the customer at S179 to change a single payment, the process continues at S180 in the pick payee process in FIG. 23. From a selection by the customer 2 at S181 to change a recurring payment, the customer is transferred to a CSR at S182. In order to change a recurring payment, at S181, the customer 2 presses, for example, "2" (or says "two") and is transferred to a bill payment representative for assistance. Referring again to FIG. 22, if the customer 2 selects the option to cancel a future payment at S184, the customer is prompted at S185 to enter a selection to cancel a single payment or to cancel a recurring payment. From a selection by the customer 2 at S186 to cancel a single payment, or from a selection by the customer at S187 to cancel a recurring payment, the process continues at S188 to the pick payee process.

Figure 23:
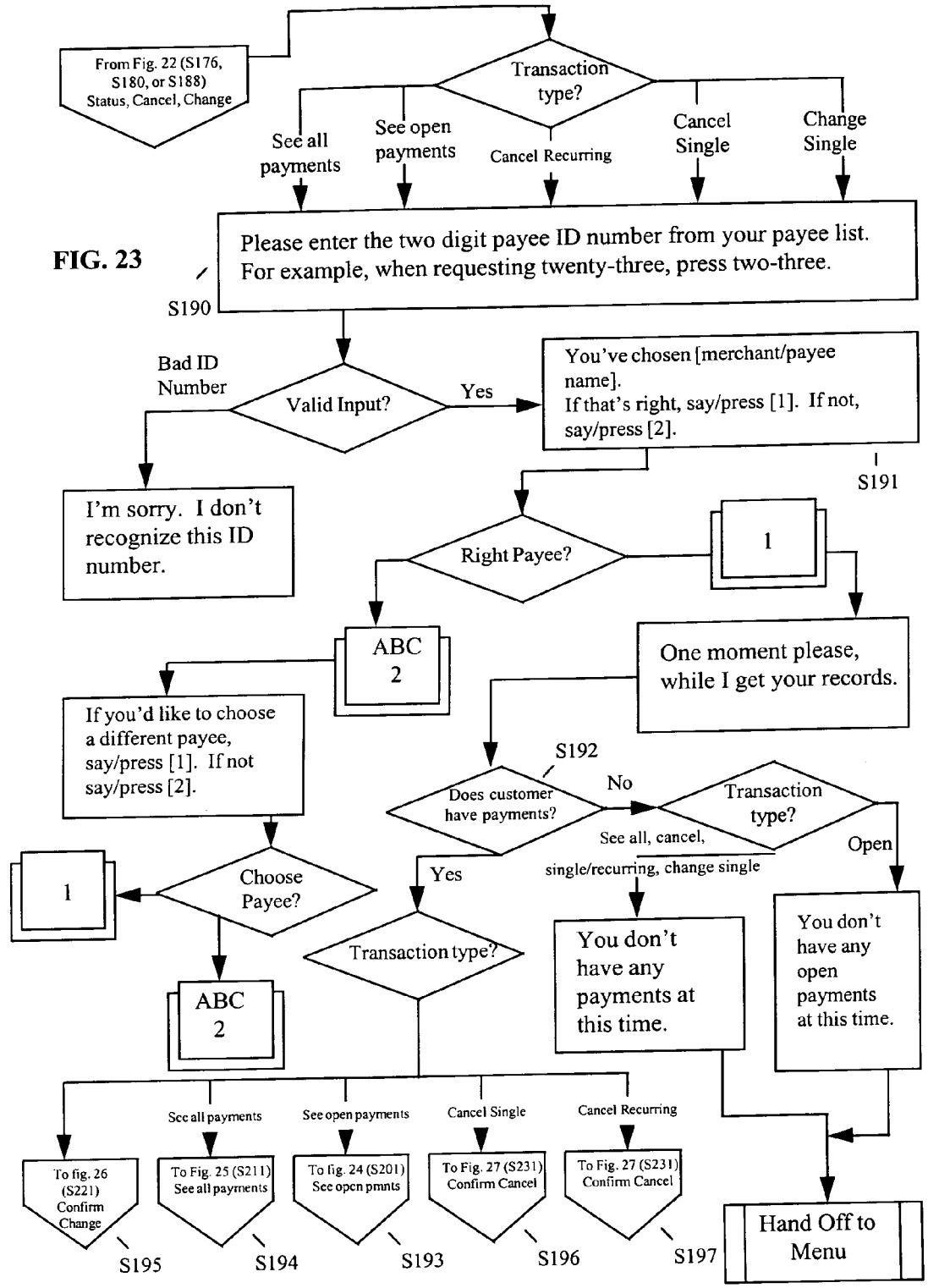
FIG. 23 is a flow chart which illustrates an example of the pick payee process for an embodiment of the present invention.

FIG. 23 is a flow chart which illustrates an example of the pick payee process for an embodiment of the present invention. Referring further to FIG. 22, from selection by the customer 2 of all open bill payments at S174, all payments at S175, change a single payment at S179, cancel a single payment at S186, or cancel a recurring payment at S187, the process continues at S176, S180, or S188 in FIG. 22 to the pick payee process. Referring to FIG. 23, at S190, the customer 2 enters the ID for the payee of the particular payment in response to a prompt by the system, and at S191, the customer confirms the payee ID in response to a prompt by the system. At S192, the system confirms the scheduling of payment(s) to the particular payee.

Referring further to FIG. 23, for the selection of all open bills in the status, change or cancel process at S174 in FIG. 22, the process continues at S193 in FIG. 23 to a see open bills process. For the selection of all payments in the status, change or cancel process at S175 in FIG. 22, the process continues at S194 in FIG. 23 to a see all payments process in FIG. 25. For the selection of change a single payment in the status, change or cancel process at S178 in FIG. 22, the process continues at S195 in FIG. 23 to a confirm change process in FIG. 26. For the selection of cancel a single payment or cancel a recurring payment in the status, change or cancel process at S186 or S187 in FIG. 22, respectively, the process continues at S196 and S197 in FIG. 23, respectively, to a confirm cancel process in FIG. 27.

Figure 24:
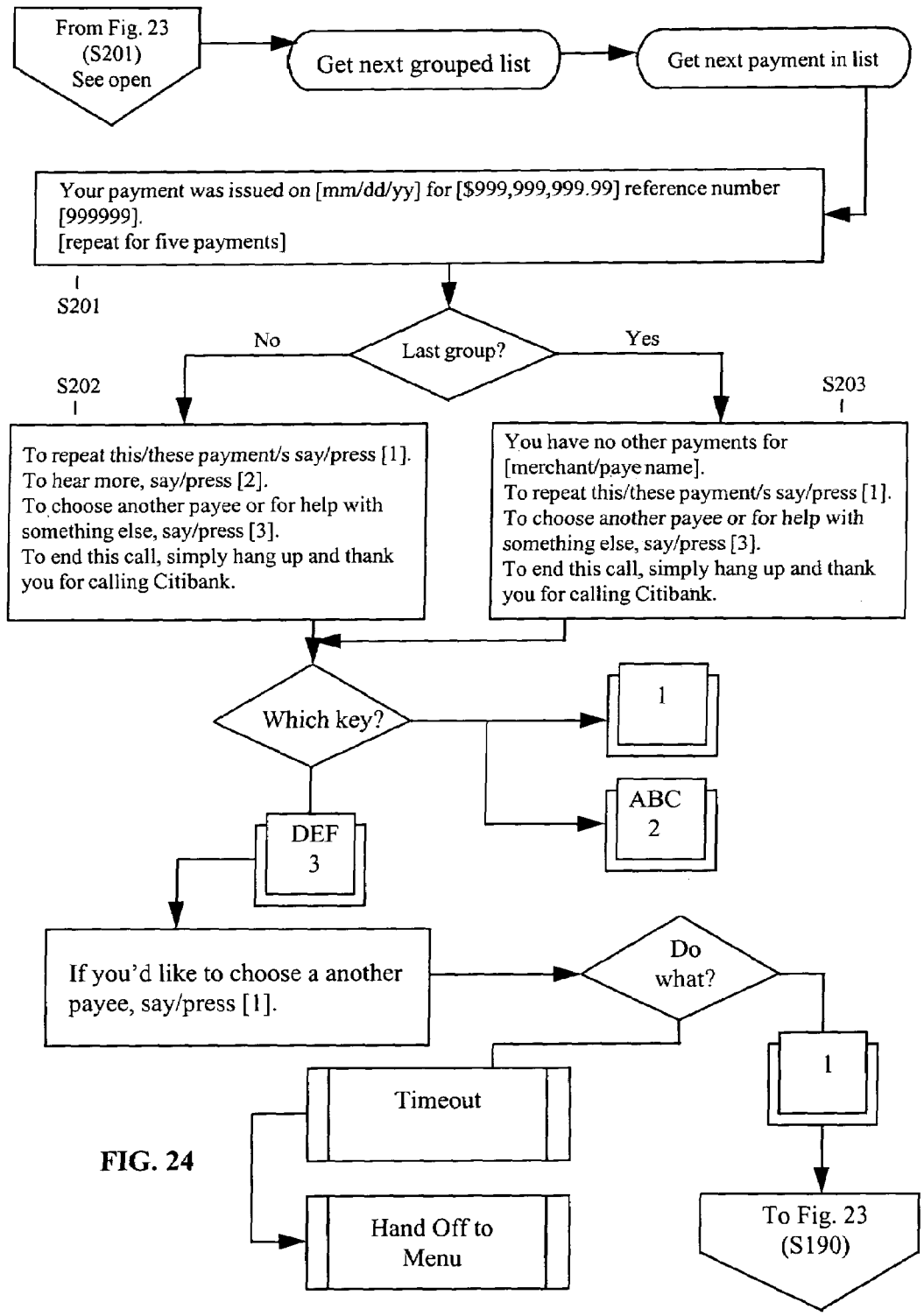
FIG. 24 is a flow chart which illustrates an example of the see open bills process for an embodiment of the present invention.

FIG. 24 is a flow chart which illustrates an example of the see open bills process for an embodiment of the present invention. Referring to FIG. 24, at S201, the system speaks to the customer 2, for example: "Your payment was issued on Jan. 23, 1999 for 320.00 dollars, reference number 999999" and continues to read, for example, up to five payments for the selected payee. At S102, the system prompts the customer 2 with additional options, such as choosing another payee. Periodically, the customer 2 may want to check the status of the customer's payments. To hear all open bill payments, at S174 in FIG. 22, the customer 2 presses, for example, "1" (or says "one"). At S201 in FIG. 24, the system then lists all payments that have not been cashed by the customer's payees, for example, within the past 90 days in payment date order. If the customer 2 does not have any open payments, at S201 in FIG. 24, the customer hears, for example: "You have no open payments for Ford Motor Credit."

Figure 25:
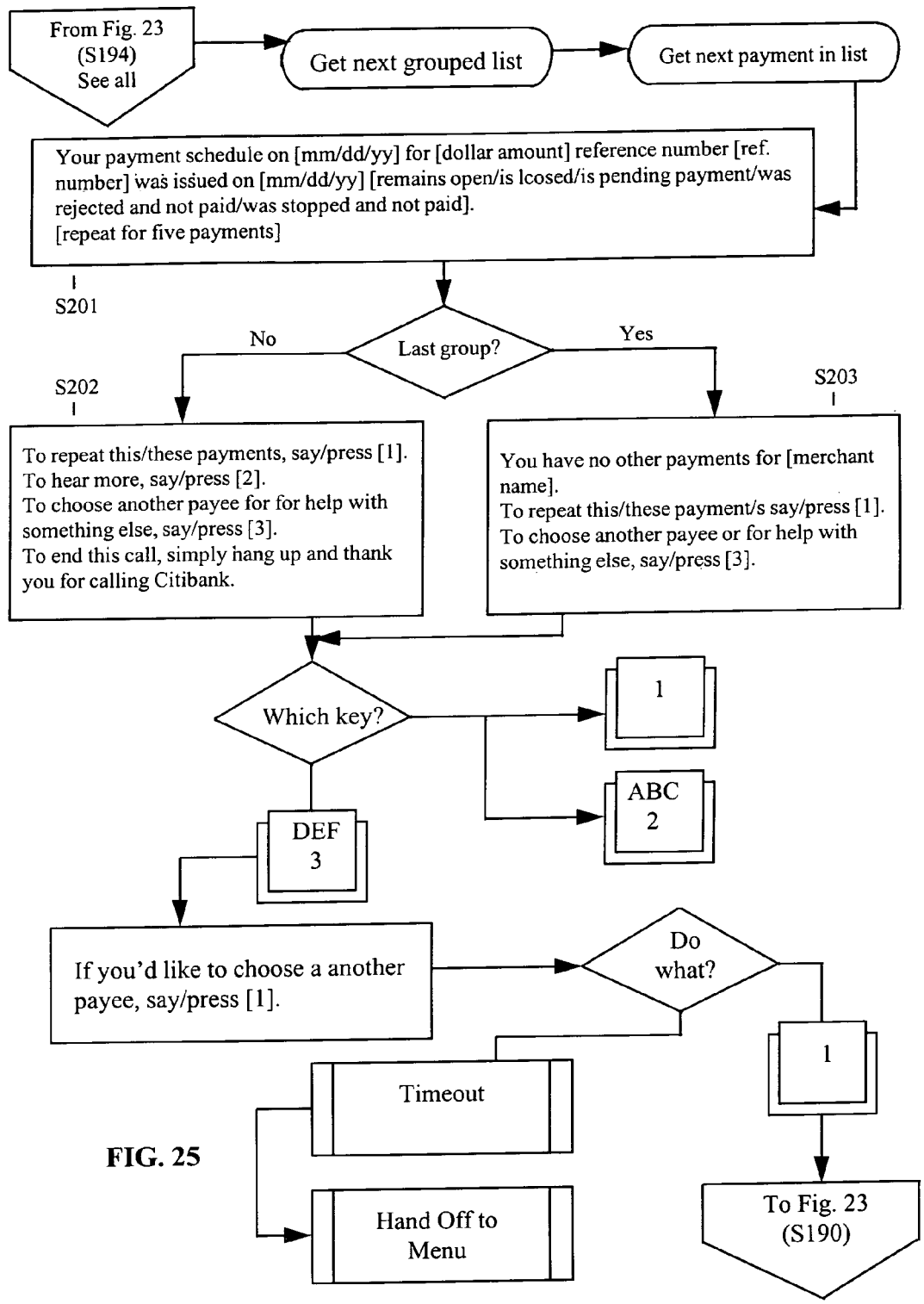
FIG. 25 is a flow chart which illustrates an example of the see all payments process for an embodiment of the present invention.

If the customer 2 has open payments, at S201 in FIG. 24, the customer hears, for example: "Your payment to Ford Motor Credit was issued on Jan. 23rd, 1999, for 350.00 dollars, reference number 999999." The customer 2 hears the customer's open payments in groups of five, until all open payments have been listed. After all of the customer's open payments have been listed, at S203, the customer 2 hears, for example: "You have no other open payments for Ford Motor Credit." The customer 2 can terminate the listing at any time, for example, by pressing "#" (or saying "pound") to return to the main menu, by pressing "0" (or saying "zero"), or by simply hanging up FIG. 25 is a flow chart which illustrates an example of the see all payments process for an embodiment of the present invention. Referring to FIG. 25, at S211, the system speaks to the customer 2, for example: "Your payment scheduled on Jan. 23, 1999 for 320.00 dollars, reference number 999999, was issued on Jan. 23, 1999 (or remains open, is closed, is pending payment, was rejected and not paid, was stopped and not paid)" and continues to read, for example, up to 5 payments for the selected payee. At S212, the system prompts the customer 2 with additional options, such as choosing another payee.

In an embodiment of the present invention, the customer 2 can access the system and choose the see all payments option to listen to the status of a payment. At S211 in FIG. 25, the system then tells the customer 2 if the payment is open, meaning that the merchant has not been paid or that the payment has not been cashed by the merchant. Once the merchant cashes the payment, at S211, the system tells the customer 2 that the payment to that merchant has been closed. The system provides the customer 2 with the status of merchant payment, for example, for at least 90 days prior to the date of access, and for all merchants to which the customer has scheduled payments. The customer 2 can request information by list of all merchants paid, or the customer can request all information for a specific merchant.

In the see all payments process for an embodiment of the present invention, the customer 2 can obtain information on all the customer's payments. In order to hear information on all payments, the customer presses, for example, "2" (or says "two"). The system then lists all payments regardless of their status at S211 in FIG. 25, sorted by payment date, for example, for the last 90 days. The customer 2 hears these payments in groups of 5. For example, the customer hears at S211: "Your payment to Ford Motor Credit for 350.00 dollars reference number 999999 was issued on Jan. 23rd, 1999 remains open." If the payment was already cashed by the customer's payee, the customer 2 hears at S211, for example: "Your payment to Ford Motor Credit for 350.00 dollars reference number 999999 was issued on Jan. 23rd, 1999 cleared on Jan. 27th, 1999 is closed."

In this example, if the payment was not cashed or received by the customer's payee, the customer 2 hears at S211 in FIG. 25, for example: "Your payment to Ford Motor Credit for 350.00 dollars reference number 999999 scheduled for Jan. 23rd, 1999 was rejected and not paid." In the same example, if the customer 2 requested a stop payment on any payment, the customer 2 will hear at S211, for example: "Your payment to Ford Motor Credit for 350.00 dollars reference number 999999 scheduled on Jan. 23rd, 1999 was stopped and not paid." After information on all payments is listed the customer 2 hears at S213, for example: "You have no other payments." The customer 2 can terminate the listing, for example, by pressing "#" (or saying "pound") to return to the main menu, or by pressing "0" (or saying "zero") to speak to a bill payment representative, or by simply hanging up.

Figure 26:
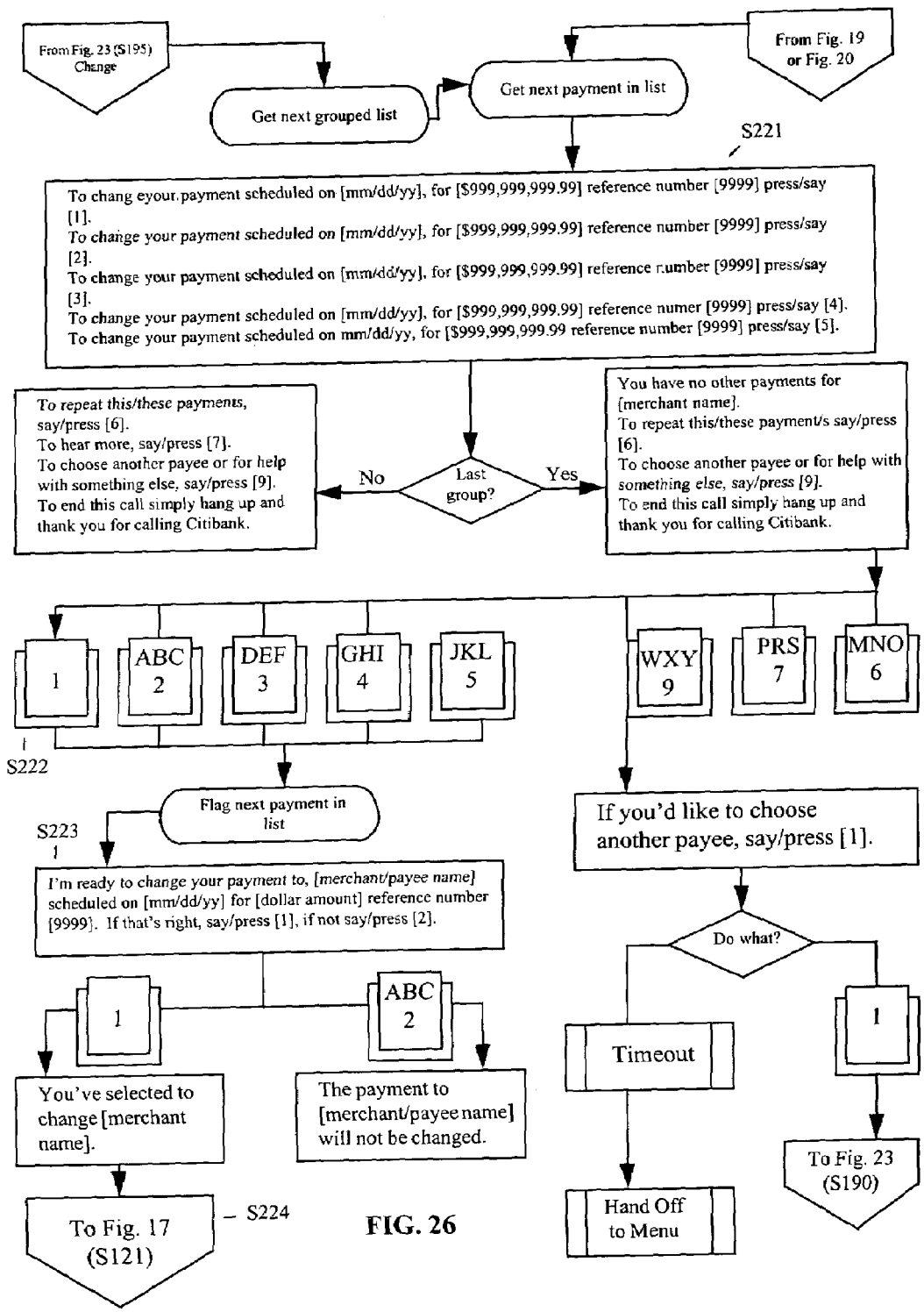
FIG. 26 is a flow chart which illustrates an example of the confirm change process for an embodiment of the present invention.

FIG. 26 is a flow chart which illustrates an example of the confirm change process for an embodiment of the present invention. Referring to FIG. 26, at S221, the system speaks to the customer 2, for example: "To change your payment scheduled on Jan. 23, 1999 for 230.00 dollars, reference number 999999, press "1" (or say "one"). If the customer 2 presses "1" (or says "one") at S222, the system confirms the intended change to the customer at S223, and at S224, the process continues in the payment amount process shown in FIG. 17.

In the event the customer 2 wishes to change any of the customer's scheduled payments, the customer must do so, for example, before 11:59 p.m. EST on the day prior to the scheduled payment date. To change a payment, at S171 in FIG. 22 (status, change or cancel process), the customer presses, for example, "3" or (says "three"). The customer 2 is then allowed to change a single payment or a recurring payment. In order to change a single payment, at S174 in FIG. 22, the customer presses, for example, "1" (or says "one"). The customer 2 then selects the payment that the customer wishes to change, and the system cancels the payment, allows the customer 2 to reschedule the payment, and then gives the customer a reference number. This cycle is repeated until the customer makes all the changes that the customer wishes to make.

Figure 27:
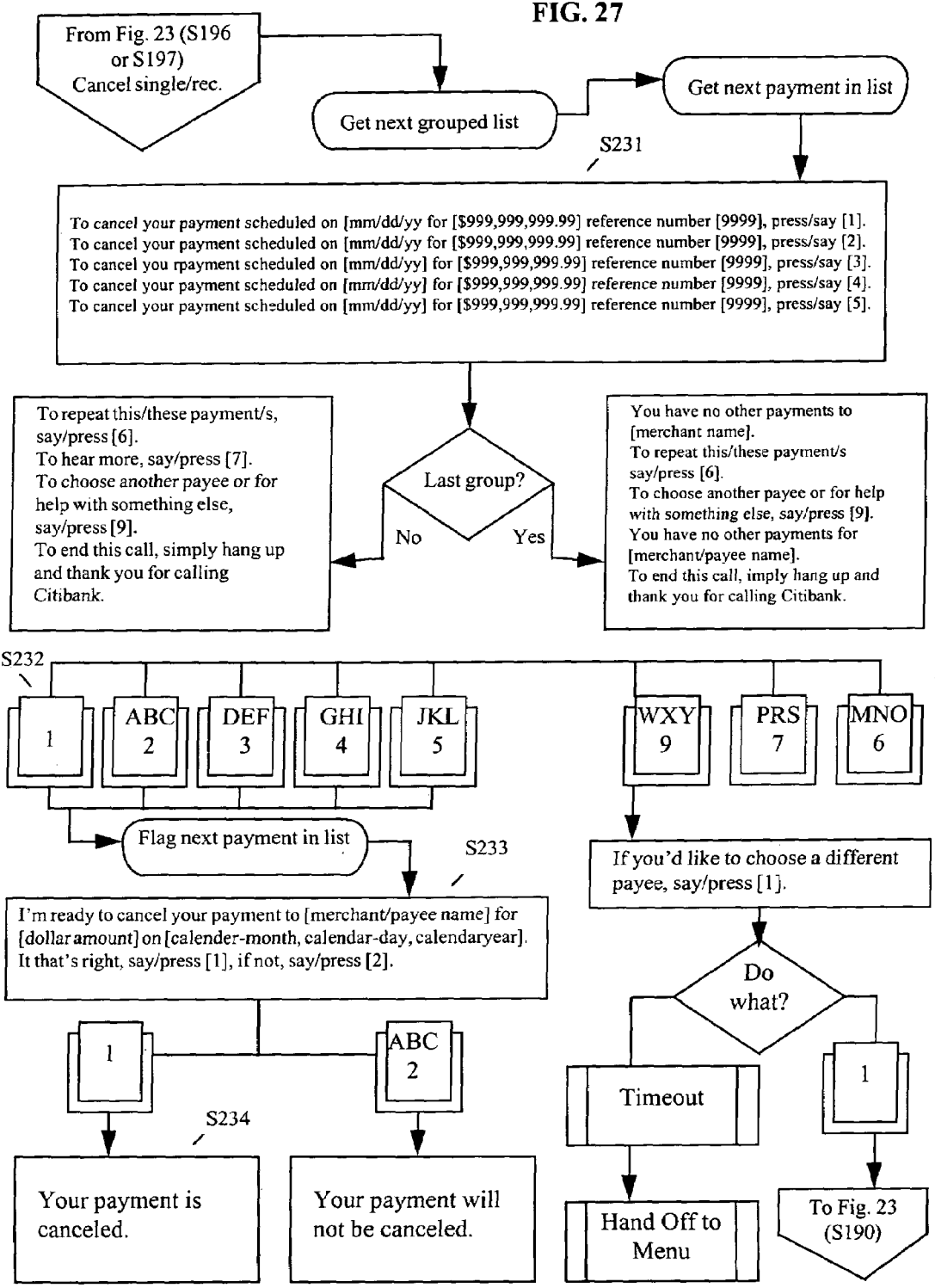
FIG. 27 is a flow chart which illustrates an example of the confirm cancel process for an embodiment of the present invention.

FIG. 27 is a flow chart which illustrates an example of the confirm cancel process for an embodiment of the present invention. Referring to FIG. 27, at S231, the system speaks to the customer 2, for example: "To cancel your payment scheduled on Jan. 23, 1999 for 230.00 dollars, reference number 999999, press "1" (or say "one"). If the customer 2 presses "1" (or says "one") at S232, the system confirms the intended cancellation to the customer at S233, and at S22, the system confirms the canceled payment to the customer. In order to cancel any of the customer's scheduled payments, the customer 2 must likewise do so before 11:59 p.m. EST on the day before the scheduled payment.

In an embodiment of the present invention, to cancel a payment, at S171 in FIG. 22 (status, change or cancel process), the customer 2 selects this option, and the system says to the customer at S185 in FIG. 22, for example: "To cancel a single payment, press 1." The customer then presses "1" (or says "one") at S186 to select the option. At S190 in FIG. 23 (pick payee process), the system then asks the customer 2 for the ID number for the merchant for which payment is to be canceled, and the customer enters the ID number, such as number eleven for Ford Motor Credit. At S191 in FIG. 23, the system confirms the payee, and the system says to the customer, for example: "One moment please, while we get your records." The system then provides the customer 2 with the payments that are cancelable.

In an embodiment of the present invention, the customer 2 can cancel open payments that have been scheduled but that have not been sent out or cashed. Once a payment has been canceled, the customer 2 is provided a reference number for the merchant for which payment has been canceled. The system does not cancel the merchant's instructions for payment or the information on the merchant, but only the instructions to send out payments to that merchant. In an embodiment of the present invention, the customer 2 is able to check the status of payments that are scheduled to be paid in the future. For example, if the customer 2 schedules a payment one year in advance, which is a maximum allowable time schedulable for an embodiment of the present invention, the customer can check the schedule that includes that payment, and the customer has the ability to cancel that payment, as well.

Figure 28:
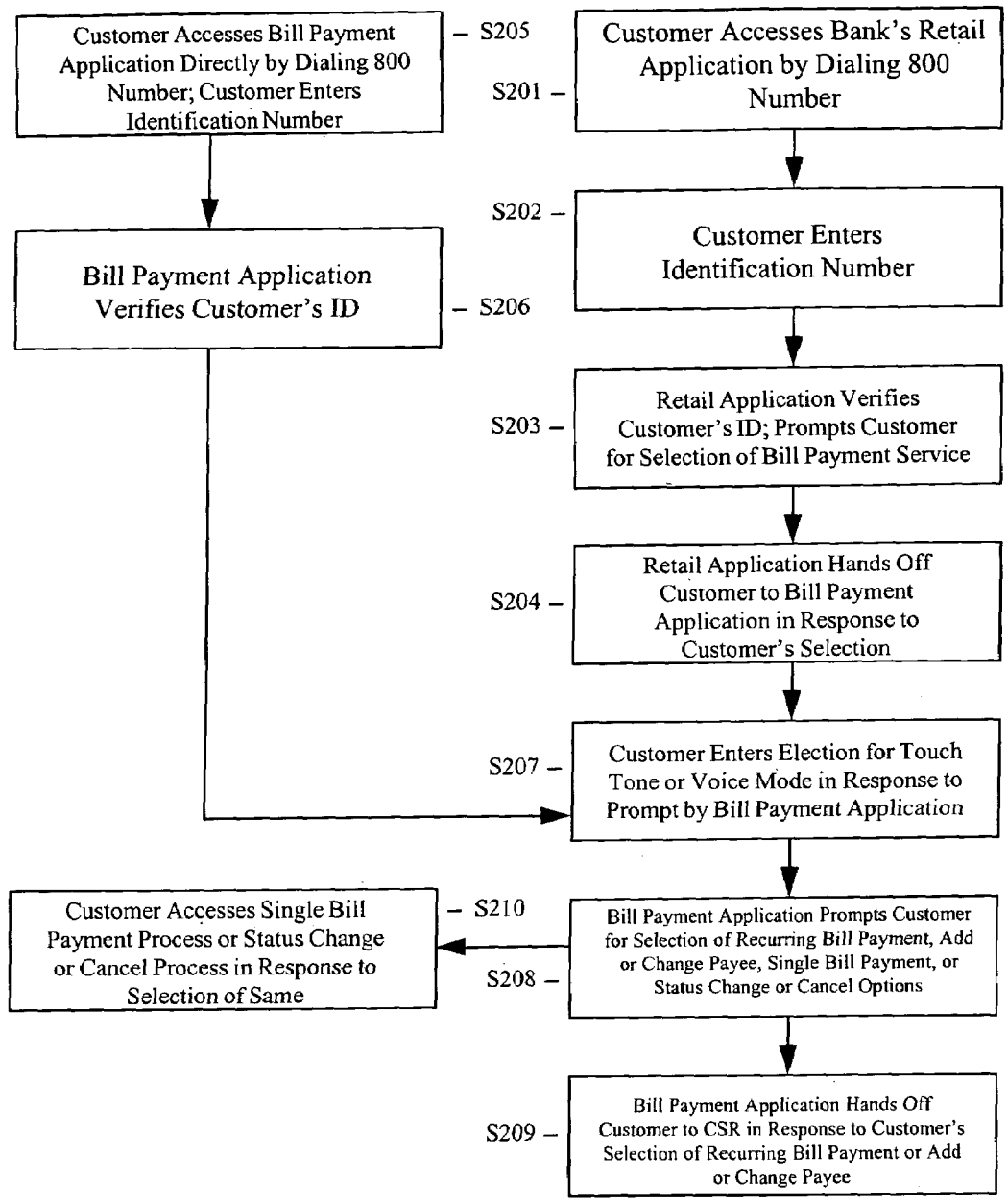
FIG. 28 is a flow chart which shows an overview of a sample process of the customer accessing the bill payment application for an embodiment of the present invention.

FIG. 28 is a flow chart which shows an overview of a sample process of the customer accessing the bill payment application for an embodiment of the present invention. Referring to FIG. 28, at S201, the customer 2 at a terminal 4, such as a telephone, accesses the bank's retail application 10 by dialing, for example, an 800 number. At S202, the customer enters one or more identification numbers, such as the customer's bank card number and access code number in response to prompts by the retail application 10. At S203, the retail application 10 verifies the customer's identification and prompts the customer 2 for a selection of the bill payment service. At S204, the retail application 10 automatically hands the customer off to the bank's bill payment application 8, together with the customer's card number and access code, in response to entry of a selection by the customer 2 for the bill payment service.

Referring further to FIG. 28, alternatively, at S205, the customer 2 at the terminal 4, such as the telephone, accesses the bank's bill payment application 8 directly by dialing, for example, another 800 number and enters the customer's bank card and access code numbers in response to prompts by the bill payment application. At S206, the bill payment application 8 verifies the customer's identification. Regardless of the customer's mode of access, at S207, the customer 2 enters an election for one of the touch tone or voice modes of communication in response to a prompt for an election by the bill payment application 8.

Referring again to FIG. 28, at S208, the bill payment application 8 prompts the customer with a bill payment menu for selection of one of recurring bill payment, add or change a payee, single bill payment, or status, change or cancel options. At S209, in response to entry by the customer 2 of a selection of recurring bill payment or add or change a payee, the bill payment application 8 automatically hands off the customer 2 to a CSR. At S210, in response to entry by the customer 2 of a selection of single bill payment or status, change or cancel, the customer accesses the single bill payment process or the status, change or cancel process.

Figure 29:
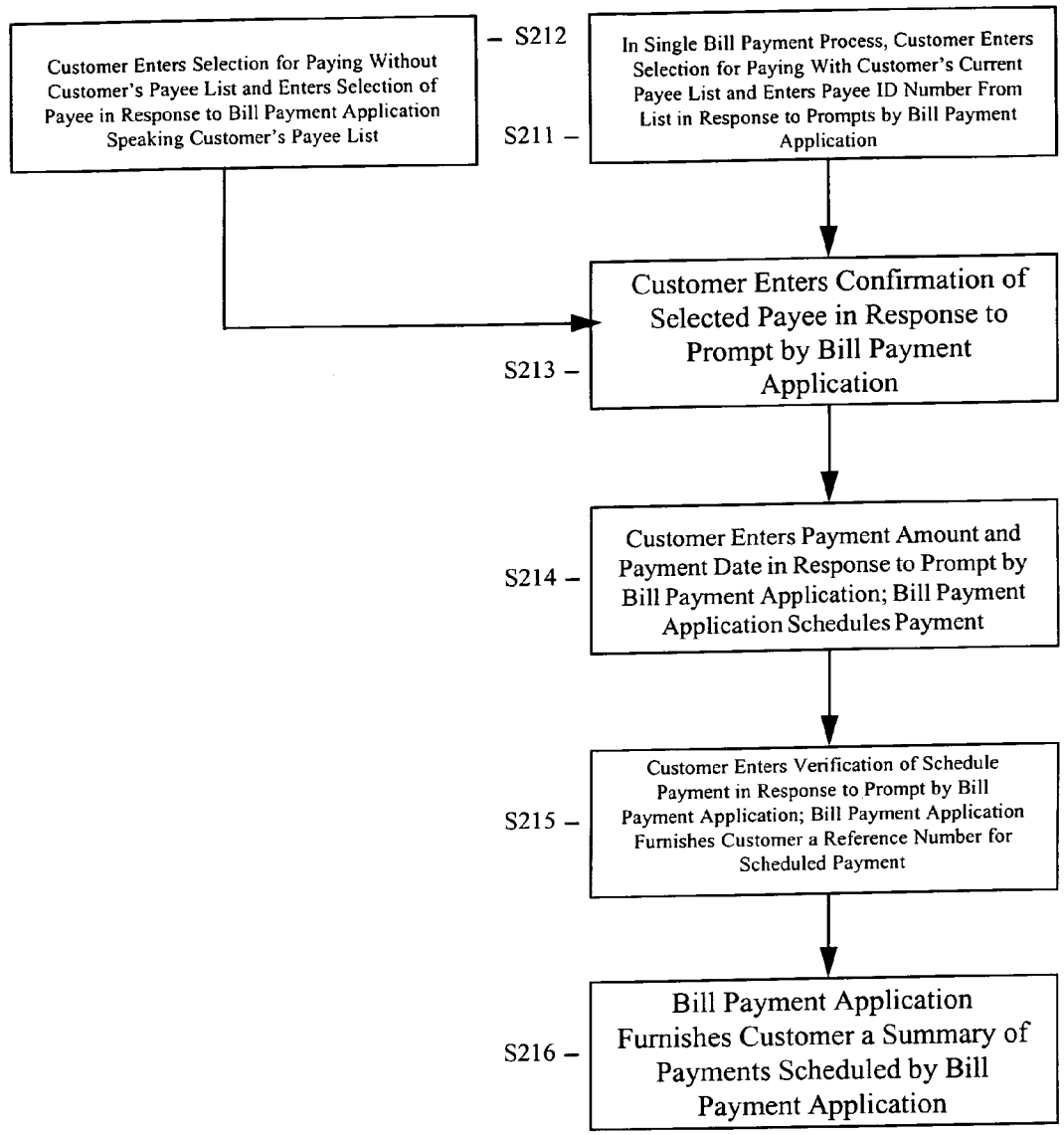
FIG. 29 is a flow chart which illustrates an overview of a sample process of the customer accessing the single bill payment option for an embodiment of the present invention.

FIG. 29 is a flow chart which illustrates an overview of a sample process of the customer accessing the single bill payment option for an embodiment of the present invention. Referring to FIG. 29, in the single bill payment process, at S211, the customer 2 enters a selection for paying with the customer's current payee list and enters a payee ID number from the customer's payee list in response to prompts by the bill payment application 8. Alternatively, at S212, the customer 2 enters a selection for paying without the customer's current payee list available and enters a selection of the payee in response to the bill payment application 8 automatically speaking the customer's payee list to the customer.

Referring further to FIG. 29, regardless of the manner of selecting the payee, at S213, the customer enters a confirmation of the selected payee in response to a prompt by the bill payment application 8. At S214, the customer 2 enters a payment amount and a payment date in response to prompts by the bill payment application 8, and the bill payment application schedules the payment accordingly. At S215, the customer enters a verification of the scheduled payment in response to a prompt by the bill payment application 8, and the bill payment application furnishes the customer a reference number for the scheduled payment. At S216, the bill payment application 8 furnishes the customer 2 a summary of payments scheduled by the bill payment application for the customer.

In an embodiment of the present invention, payments scheduled for the customer 2 by the bill payment application 8 are made in a number of different ways. For example, most payments are made with a bank cashier's check issued in the customer's name to the payee. Such checks include, for example, the customer's name and address and the customer's account number with the payee, if applicable, and are sent to the payee through the mail. Another method of payment is, for example, through electronic funds transfer. Merchants who are paid through electronic funds transfer receive payment information, including the customer's account number with the payee, through a direct computer link with the bank. An additional method of payment used, for example, when the payee is not linked via an electronic computer link but receives a large number of payments from different customers of the bank, is by a consolidated check covering all such payments. All information which the payee needs to credit individual customers' accounts is provided with the consolidated check. In any case, the funds are taken from the customer's account on the date the payment is made or scheduled to be made.

Figure 30:
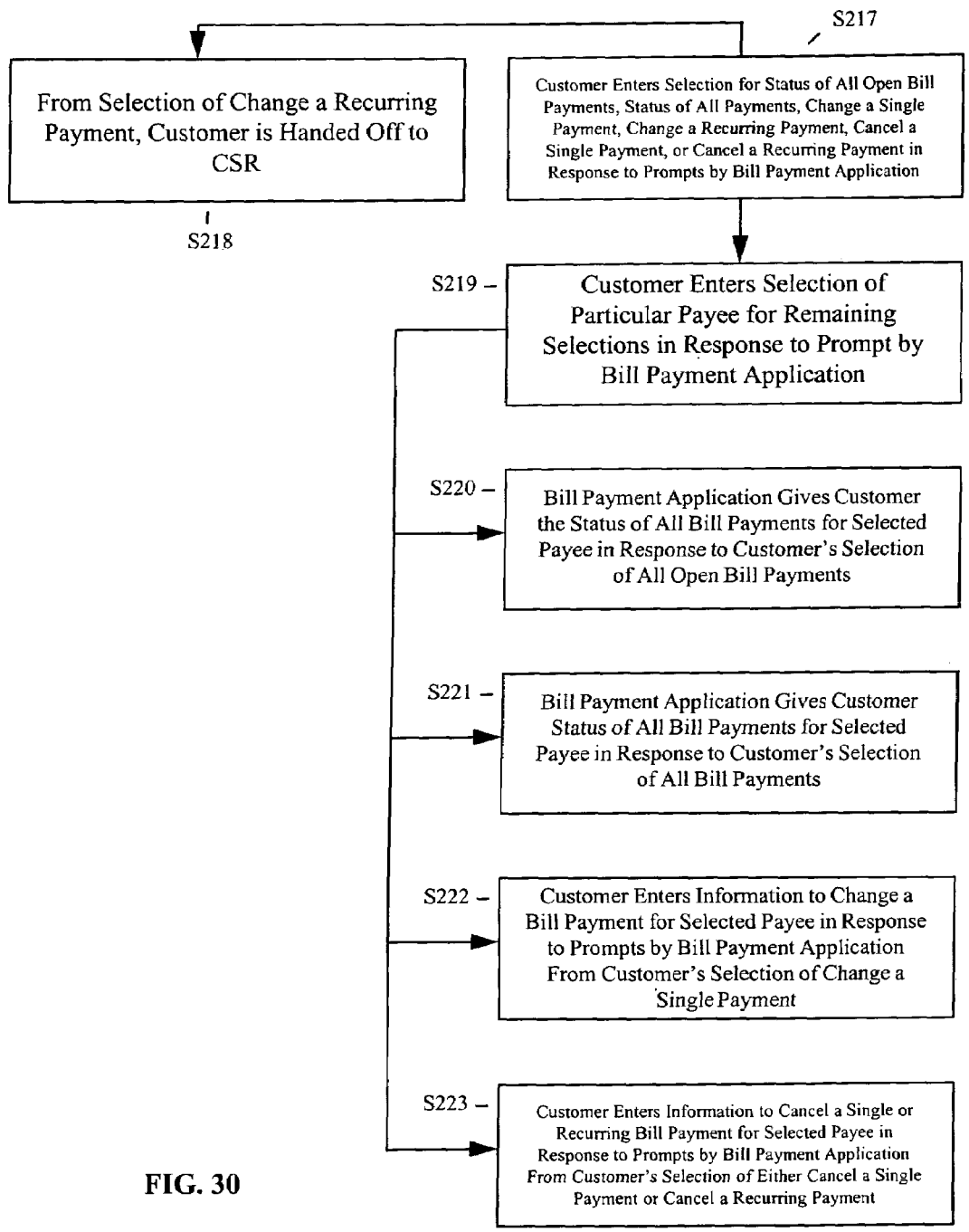
FIG. 30 is a flow chart which shows an overview of a sample process of the customer accessing the status, change or cancel option for an embodiment of the present invention.

FIG. 30 is a flow chart which shows an overview of a sample process of the customer accessing the status, change or cancel option for an embodiment of the present invention. Referring to FIG. 30, at S217, the customer 2 enters a selection for status of all open bill payments, status of all payments, change a single payment, change a recurring payment, cancel a single payment or cancel a recurring payment in response to prompts by the bill payment system 8. At S218, from a selection of change a recurring payment, the customer 2 is handed off to a CSR.

Referring further to FIG. 30, at S219, the customer 2 enters a selection of a particular payee for the remaining selections in response to a prompt by the bill payment system 8. At S220, the bill payment application 8 gives the customer 2 the status of all open bill payments for the selected payee in response to the customer's selection of all open bill payments. At S221, the bill payment application 8 gives the customer 2 the status of all bill payments for the selected payee in response to the customers selection of all bill payments. At S222, the customer 8 enters information to change a bill payment for the selected payee in response to prompts by the bill payment application 8 from the customer's selection of change a single payment. At S223, the customer 2 enters information to cancel a single or recurring bill payment for the selected payee in response to prompts by the bill payment application 8 from the customer's selection of either cancel a single payment or cancel a recurring payment.

The system of an embodiment of the present invention uses the DTMF technology for other functions, such as DTMF cut-through, that allow the customer 2, for example, to speed ahead. The DTMF cut-through functionality for an embodiment of the present invention enables the voice response system to receive DTMF tones or "touch tones" while the voice synthesizer is delivering information, such as during speech playback. For example, if the customer 2 knows that he or she wants to select a particular option two, the customer can press "2" while the interactive voice recognition (IVR) system is reading all the other options, and the system stops playing the current list, and goes to option two.

The DTMF cut-through function is particularly useful to the customer 2, if the customer has used the system previously and knows where he or she wants to be within the system. In other words, the customer 2 can immediately proceed with a sequence without waiting for menu commands. For example, the customer 2 can enter the customer's bank card number and press "*"; enter the customer's access code number and press "*" and "1" for single bill payment at S41 in FIG. 9 (bill payment menu process); press "2" to enter a payee ID at S72 in FIG. 12 (single bill payment process); input the payee ID, for example, as "11" at S81 in FIG. 13 (pay with payee ID process); and the system says, for example: "Ford Motor Credit" at S111 in FIG. 16 (payee verification process). At this point, the customer 2 can expect the system to make a payment to Ford Motor Credit.

An embodiment of the present invention also makes use, for example, of a collect digits functionality, which provides the ability to store dialed numbers to more quickly navigate menus. For example, the customer 2 can pre-enter a series of option choices to get to a familiar area of the IVR system. These numbers can also be programmed by the customer 2 into the speed dial of a home phone. Further, a speed control functionality for an embodiment of the present invention provides the capability to control how fast the IVR system speaks. Thus, while listening to the bill payment IVR system, the customer 2 can press, for example, the "9" key to make the voice prompt speak faster or slower, cycled through steps. Additionally, a volume control functionality for an embodiment of the present invention provides the ability to control the loudness of the IVR system. Therefore, while listening to the bill payment IVR system, the customer 2 can press, for example, the "7" key to make the system speak louder or softer, likewise cycled through steps.

Anytime service choices are placed in various locations in the application 8 for an embodiment of the present invention. For example, to repeat information, the customer presses "8" (or says "eight"); to speak with a representative, the customer presses "0" (or says "zero"); to return to the bill payment service choices; the customer presses "#" (or says "pound"); for banking services other than bill payment, the customer presses "#-*" (or says "pound-star"); or to end the call, the customer simply hangs up. In an embodiment of the present invention, if a menu times out, pressing, for example, "8" repeats the menu.

In an embodiment of the present invention, a fax-back functionality provides the ability to select a specific fax, and have it sent from the fax server to the customer's local fax machine. For example, the customer 2 can have a fax sent to the customer of the customer's bill payment session, listing the customer's payment information and confirmation numbers, or the customer can have a bill payment problem resolution faxed to the customer. Another functionality for an embodiment of the present invention is information on demand, which provides the capability to have a pre-recorded message played back to the customer 2. For example, if the customer 2 requests more information on the bank's bill payment service, a pre-recorded message about the system is played back to the customer.

In an embodiment of the present invention, if the customer 2 enters a key that is considered an invalid entry anywhere within the application, the system states, for example: "I'm sorry I don't recognize your selection" and repeats the previous prompt. The application re-prompts a pre-defined number of times, such as twice, during an invalid entry, giving the customer 2, for example, two chances at the customer's selection. If a customer 2 enters an invalid selection, for example, the third time, the application refers the customer to a representative, and states, for example: "Please hold for the next available representative."

Throughout the application 8 for an embodiment of the present invention, the system time-out parameter is a predetermined time, such as 15 seconds, unless otherwise provided. The host time-out parameter is, for example, 20 seconds. During a time-out, the application repeats the previous prompt. Time-outs are subject to the same rule as the invalid entry rule of giving the customer, for example, four chances. The application only repeats the previous prompt, for example, four times. If the customer 2 does not enter anything after the prompt has been repeated, the application refers the customer to a representative, and states, for example: "Please hold for the next available representative." After, for example, two combinations of either an invalid entry or a time-out, the customer 2 is referred to a representative, and the system states, for example: "Please hold for the next available representative."

Another aspect of the system for an embodiment of the present invention is a survey module, which prompts the customer 2 for selection of an option to participate in a satisfaction survey at appropriate times. For example, the customer 2 is prompted with the survey option selection following the process of scheduling a recurring bill payment, adding or changing a payee, scheduling a single bill payment, and canceling a future payment, checking a future payment, or changing a future payment.

In the survey module aspect for an embodiment of the present invention, if the customer 2 selects the option, the customer is asked to answer a number of questions by saying or pressing "one" for a positive response or by saying or pressing "two" for a negative response. The questions include, for example, whether the customer 2 found the system easy and clear to use, whether the system provided complete and useful information, whether the customer was able to successfully complete his or her objective without speaking to a customer service representative, and whether the customer will continue to use the system. The customer 2 is also offered the opportunity to record any additional comments in a voice mail message.

Various embodiments of the invention have been described in fulfillment of the various objects of the invention. It should be appreciated that these embodiments are merely illustrative of the principles of the present invention. Numerous modifications and adaptations therefor will be readily apparent to those skilled in the art without departing from the spirit and scope of the present invention. Accordingly, the invention is only limited by the following claims.

What is claimed is:

1. A method of bill payment service for a customer, comprising:

receiving identification information for the customer by a retail system application in response to an automatic prompt of the customer by the retail system application;

automatically verifying the identification information by the retail system application and handing off the customer and the identification information to a bill payment application;

receiving a customer selection of one of a touch tone mode and a voice mode of communication in response to an automatic prompt by the bill payment application;

receiving a customer selection of a bill payment option from a group of bill payment options consisting of a recurring bill payment option, an add or change payee for bill payment option, a single bill payment option, and a status, change or cancel bill payment option, in response to an automatic prompt by the bill payment application;

automatically, non-optionally handing off the customer to a customer service representative by the bill payment application for a non-automated verification of the customer's identification by the customer service representative at a telephone as a security measure, if the customer selection is received for one of the recurring bill payment option and the add or change payee for bill payment option;

receiving a customer selection of an option to designate a payee from one of a customer-specific payee identification list of the customer and a common payee list provided by the bill payment application, in response to an automatic prompt by the bill payment application;

receiving a customer selection of an option to designate the payee by one of entering a payee ID by the customer from the customer-specific payee identification list and selecting the payee from the customer-specific payee identification list spoken by the bill payment application, if the option to designate the payee from the customer-specific payee identification list is received;

receiving information about a payment amount for at least one bill payment for the customer by the bill payment application in response to an automatic prompt by the bill payment application;

receiving information about a payment date for the bill payment by the bill payment application in response to an automatic prompt by the bill payment application;

automatically scheduling the bill payment by the bill payment application for the customer according to the bill payment information;

receiving a confirmation of the payee, the payment amount, and the payment date for the scheduled bill payment by the bill payment application in response to an automatic prompt by the bill payment application; and rendering the scheduled bill payment to the payee by the bill payment application for the customer by one of a check and an electronic transfer of funds to the designated payee on the payment date indicated by the customer.

2. The method of claim 1, wherein receiving the selection for one of the touch tone and voice modes of communication further comprises receiving a selection for the voice mode of communication for the customer.

3. The method of claim 2, wherein receiving the selection for the voice mode of communication further comprises receiving bill payment information for the customer in the voice mode by the bill payment application.

4. The method of claim 1, wherein receiving the selection for one of the touch tone and voice modes of communication further comprises receiving a selection for the touch tone mode of communication.

5. The method of claim 4, wherein receiving the selection for the touch tone mode of communication further comprises receiving bill payment information for the customer in the touch tone mode by the bill payment application.

6. The method of claim 1, wherein receiving the customer selection of the bill payment option further comprises receiving an election for the recurring bill payment option for the customer by the bill payment application.

7. The method of claim 1, wherein receiving the customer selection of the bill payment option further comprises receiving an election for the add or change a payee for bill payment option for the customer by the bill payment application.

8. The method of claim 1, wherein receiving the customer selection of the bill payment option further comprises receiving an election for the single bill payment option for the customer by the bill payment application.

9. The method of claim 1, wherein receiving the customer selection of the bill payment option further comprises receiving an election for the status, change or cancel bill payment option for the customer by the bill payment application.

10. The method of claim 1, wherein receiving the customer selection of the option to designate the payee by entering the payee ID from the customer-specific payee identification list further comprises receiving an ID number for the payee from the customer's payee ID list by the bill payment application.

11. The method of claim 10, wherein receiving the ID number for the payee further comprises automatically identifying the payee by the bill payment application according to the ID number for the payee.

12. The method of claim 1, wherein receiving the customer selection of the option to designate the payee by selecting the payee from the customer-specific payee identification list spoken by the bill payment application further comprises receiving a selection of the payee for the customer from the spoken payee list by the bill payment application.

13. The method of claim 12, wherein receiving the selection of the payee for the customer from the spoken customer-specific payee list further comprise automatically identifying the payee by the bill payment application according to the selection.

14. The method of claim 1, wherein receiving the customer selection of the option to designate the payee from the common payee list provided by the bill payment application further comprises receiving a selection of the payee for the customer from the common payee list spoken by the bill payment application.

15. The method of claim 14, wherein receiving the selection of the payee for the customer from the spoken common payee list further comprises automatically identifying the payee by the bill payment application according to the selection.

16. The method of claim 1, wherein automatically scheduling the bill payment further comprises automatically assigning a payment reference for the scheduled bill payment by the bill payment application.

17. The method of claim 16, wherein automatically assigning the payment reference further comprises automatically furnishing the payment reference for the scheduled bill payment to the customer by the bill payment application.

18. The method of claim 1, wherein automatically scheduling the bill payment further comprises automatically summarizing bill payments scheduled for the customer by the bill payment application.

19. The method of claim 18, wherein automatically summarizing bill payments further comprises automatically prompting the customer by the bill payment application for a selection by the customer to hear a list of bill payments scheduled for the customer.

20. The method of claim 19, wherein automatically summarizing bill payments further comprises automatically speaking the list of bill payments scheduled for the customer in response to the selection by the customer to hear the list of bill payments.

21. The method of claim 1, wherein rendering the scheduled bill payment by check further comprises combining the scheduled bill payment with at least one additional bill payment in the check.

22. The method of claim 1, wherein receiving the selection for the status, change or cancel bill payment option further comprises receiving a selection by the customer from one of a group of selections consisting of status of future bill payments for the customer, change a future bill payment for the customer, and cancel a future bill payment for the customer.

23. The method of claim 22, wherein receiving the selection from the group of selections further comprises receiving the selection in response to an automatic prompt of the customer by the bill payment application for the selection.

24. The method of claim 22, wherein receiving the selection from the group of selections further comprises receiving a selection by the customer for the status of future bill payments for the customer.

25. The method of claim 24, wherein receiving the selection for the status of future bill payments further comprises receiving a selection for the customer for one of status of all open bill payments for the customer and status of all bill payments for the customer.

26. The method of claim 25, wherein receiving the selection further comprises receiving the selection for the status of all open bill payments for the customer.

27. The method of claim 26, wherein receiving the selection for the status of all open bill payments further comprises automatically speaking the status of all open bill payments for the customer.

28. The method of claim 25, wherein receiving the selection further comprises receiving the selection for the status of all bill payments for the customer.

29. The method of claim 28, wherein receiving the selection for the status of all bill payments further comprises automatically speaking the status of all bill payments for the customer.

30. The method of claim 22, wherein receiving the selection from the group of selections further comprises receiving a selection by the customer for the change of a future bill payment for the customer.

31. The method of claim 30, wherein receiving the selection for the change of a future bill payment further comprises receiving a selection for the customer for one of change a single bill payment for the customer and change a recurring bill payment for the customer.

32. The method of claim 31, wherein receiving the selection further comprises receiving the selection for the change of a single bill payment for the customer.

33. The method of claim 32, wherein receiving the selection for the change of a single bill payment for the customer further comprises receiving bill payment change information for the customer in response to automatic prompts of the customer by the bill payment application.

34. The method of claim 31, wherein receiving the selection further comprises receiving the selection for change of a recurring bill payment for the customer.

35. The method of claim 34, wherein receiving the selection for the change of a recurring bill payment for the customer further comprises automatically handing off the customer to a customer service representative by the bill payment application for a non-automated verification of the customer's identification by the customer service representative at a telephone.

36. The method of claim 22, wherein receiving the selection from the group of selections further comprises receiving a selection for the customer for cancellation of a future bill payment for the customer.

37. The method of claim 36, wherein receiving the selection for the cancellation of a future bill payment for the customer further comprises receiving a selection for the customer for one of cancellation of a single bill payment for the customer and cancellation of a recurring bill payment for the customer.

38. The method of claim 37, wherein receiving the selection further comprises receiving a selection for the cancellation of a single bill payment for the customer.

39. The method of claim 38, wherein receiving the selection for the cancellation of a single bill payment further comprises receiving single bill payment cancellation information for the customer in response to automatic prompts of the customer by the bill payment application for the information.

40. The method of claim 37, wherein receiving the selection further comprises receiving a selection for cancellation of a recurring bill payment for the customer.

41. The method of claim 40, wherein receiving the selection further comprises receiving recurring bill payment cancellation information for the customer in response to automatic prompts of the customer by the bill payment application for the information.

42. A system for bill payment service for a customer, comprising:
  means for receiving identification information for the customer by a retail system application in response to an automatic prompt of the customer by the retail system application;
  means for automatically verifying the identification information by the retail system application and handing off the customer and the identification information to a bill payment application;
  means for receiving a customer selection of one of a touch tone mode and a voice mode of communication in response to an automatic prompt by the bill payment application;
  means for receiving a customer selection a bill payment option from a group of bill payment options consisting of a recurring bill payment option, an add or change payee for bill payment option, a single bill payment option, and a status, change or cancel bill payment option, in response to an automatic prompt by the bill payment application;
  means for automatically handing off the customer to a customer service representative by the bill payment application for a non-automated verification of the customer's identification by the customer service representative at a telephone, if the customer selection is received for one of the recurring bill payment option and the add or change payee for bill payment option;

means for receiving a customer selection of an option to designate a payee from one of a customer-specific payee identification list of the customer and a payee list spoken for the customer by the bill payment application, in response to an automatic prompt by the bill payment application;

means for receiving a customer selection of an option to designate the payee by one of entering a payee ID by the customer from the customer-specific payee identification list and selecting the payee from the customer-specific payee identification list spoken by the bill payment application, if the option to designate the payee from the customer-specific payee identification list is received;

means for receiving a payment amount for at least one bill payment for the customer by the bill payment application in response to an automatic prompt by the bill payment application;

means for receiving a payment date for the bill payment by the bill payment application in response to an automatic prompt by the bill payment application;

means for automatically scheduling the bill payment by the bill payment application for the customer according to the bill payment information;

means for receiving a confirmation of the payee, the payment amount, and the payment date for the scheduled bill payment by the bill payment application in response to an automatic prompt by the bill payment application; and means for rendering the scheduled bill payment by the bill payment application to a payee for the customer by one of a check and an electronic transfer of funds to the designated payee on the payment date indicated by the customer.

43. The system of claim 42, further comprising the bill payment application running on a server.

44. The system of claim 43, further comprising the retail system application communicating with the bill payment application.

45. The system of claim 43, further comprising an input device coupled to the server.

46. The system of claim 45, wherein the input device further comprises a telephone.

47. A method of bill payment service for a customer, comprising:

providing a bill payment application accessible by the customer via a telephonic connection and having a menu of bill payment options;

establishing a condition for non-optionally handing off the customer to a customer service representative by the bill payment application for a non-automated verification of the customer's identification by the customer service representative via the telephonic connection as a security measure, said condition consisting at least in part of selection by the customer from the bill payment options for one of a recurring bill payment option and an add or change payee for bill payment option;

allowing the customer to enter at least one selection on the bill payment application from the menu of bill payment options; and automatically, non-optionally handing off the customer to the customer service representative by the bill payment application for non-automated verification of the customer's identification by the customer service representative, if the condition is met by the customer's selection.

48. A method of bill payment service for a customer, comprising:

providing a bill payment application accessible by the customer via a telephonic connection and having a menu of bill payment options consisting at least in part of an option to select a payee for a bill payment;

establishing a common payee list on the bill payment application;

establishing a customer-specific payee list on the bill payment application according to information provided by the customer; and allowing the customer to select the payee for bill payment from one of the customer-specific payee list and the common payee list in response to a prompt by the bill payment application.

49. A method of bill payment service for a customer, comprising:

providing a bill payment application accessible by the customer via a telephonic connection and having a menu of options;

establishing a common payee list on the bill payment application;

establishing a customer-specific payee list on the bill payment application according to information provided by the customer;

establishing a condition for non-optionally handing off the customer to a customer service representative by the bill payment application for a non-automated verification of the customer's identification by the customer service representative via the telephonic connection as a security measure, said condition consisting at least in part of selection by the customer from the menu of options for one of a recurring bill payment option and an add or change payee for bill payment option;

allowing the customer to enter at least one selection on the bill payment application from the menu of options;

automatically, non-optionally handing off the customer to the customer service representative by the bill payment application for non-automated verification of the customer's identification by the customer service representative, if the condition is invoked by the customer's selection; and allowing the customer to select the payee for bill payment from one of the customer-specific payee list and the common payee list in response to a prompt by the bill payment application.

50. A method of bill payment service for a customer, comprising:

providing a bill payment application accessible by the customer via a telephonic connection and having a menu of bill payment options;

establishing a common payee list and a customer-specific payee list according to information provided by the customer on the bill payment application;

establishing a condition for non-optionally handing off the customer to a customer service representative by the bill payment application for a non-automated verification of the customer's identification by the customer service representative via the telephonic connection as a security measure, said condition consisting at least in part of selection by the customer from the menu of options for one of a recurring bill payment option and an add or change payee for bill payment option;

allowing the customer to enter at least one selection on the bill payment application from the menu of bill payment options;

automatically, non-optionally handing off the customer to the customer service representative by the bill payment application for non-automated verification of the customer's identification by the customer service representative, if the condition is invoked by the customer's selection;

receiving a customer selection of an option to designate a payee from one of the common payee list and the customer-specific payee list in response to an automatic prompt by the bill payment application;

receiving a customer designation of the payee by one of entering a payee ID according to the customer specific payee list and selecting the payee from the customer-specific payee list spoken by the bill payment application, if the option to designate the payee from the customer-specific payee list is received; and receiving a customer designation of the payee by selecting the payee from the common payee list spoken by the bill payment application, if the option to designate the payee from the common payee list is received.

* * * * *